(12) United States Patent
Lynd et al.

(10) Patent No.: US 10,717,812 B2
(45) Date of Patent: Jul. 21, 2020

(54) LACTONE-EPOXIDE STATISTICAL COPOLYMERS

(71) Applicant: BOARD OF REGENTS, THE UNIVERSITY OF TEXAS SYSTEM, Austin, TX (US)

(72) Inventors: Nathaniel A. Lynd, Austin, TX (US); Malgorzata Chwatko, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 21 days.

(21) Appl. No.: 15/923,150

(22) Filed: Mar. 16, 2018

(65) Prior Publication Data

US 2018/0265628 A1 Sep. 20, 2018

Related U.S. Application Data

(60) Provisional application No. 62/472,187, filed on Mar. 16, 2017.

(51) Int. Cl.
*C08G 63/84* (2006.01)
*C08G 63/664* (2006.01)
*C08G 63/08* (2006.01)
*C08L 67/04* (2006.01)

(52) U.S. Cl.
CPC ............. *C08G 63/84* (2013.01); *C08G 63/08* (2013.01); *C08G 63/664* (2013.01); *C08L 67/04* (2013.01); *C08J 2367/04* (2013.01)

(58) Field of Classification Search
CPC ...... C08G 63/08; C08G 63/64; C08G 63/664; C08J 2367/04; C08L 67/04
See application file for complete search history.

(56) References Cited

U.S. PATENT DOCUMENTS

| | | | |
|---|---|---|---|
| 3,219,591 A | 11/1965 | Vandenberg | |
| 3,689,531 A | 9/1972 | Critchfield et al. | |
| 3,795,701 A * | 3/1974 | Jenkins | C08G 18/4269 560/185 |
| 3,867,353 A | 2/1975 | Hsieh et al. | |
| 5,075,389 A | 12/1991 | Kennedy et al. | |
| 5,700,880 A | 12/1997 | Sanchez et al. | |
| 5,919,434 A * | 7/1999 | Dugstad | A61K 49/223 424/9.52 |

OTHER PUBLICATIONS

Darensbourg et al A One-Pot Synthesis of a Triblock Copolymer from Propylene Oxide/ Carbon Dioxide and Lactide: Intermediacy of Polyol Initiators, Angew. Chem. Int. Ed. 2013, 52, 10602-10606, published online: Aug. 14, 2013.*
Romain et al Chemoselective Polymerizations from Mixtures of Epoxide, Lactone, Anhydride, and Carbon Dioxide, J. Am. Chem. Soc. 2016, 138, 4120-4131, Published: Mar. 22, 2016.*
Sachl et al Preparation and Characterization of Self-Assembled Nanoparticles Formed by Poly(ethylene oxide)-block-poly(E-caprolactone) Copolymers with Long Poly(E-caprolactone) Blocks in Aqueous Solutions, Langmuir 2007, 23, 3395-3400, Published on Web Feb. 2, 2007.*
Kim et al Preparation and characterization of biodegradable nanospheres composed of methoxy poly(ethylene glycol) and DL-lactide block copolymer as novel drug carriers, Journal of Controlled Release 56 (1998) 197-208, published on Jan. 1998.*
Hwang et al "Terpolymerization of CO2 with Propylene Oxide and E-Caprolactone Using Zinc Glutarate Catalyst, Macromolecules" 2003, 36, 8210-8212, Published on Web Oct. 2, 2003.*
Atwood, D. A.; Yearwood, B. C. The Future of Aluminum Chemistry. Journal of Organometallic Chemistry 2000, 600, 186-197.
Baumgartner, R.; Song, Z.; Zhang, Y.; Cheng, J. Functional Polyesters Derived From Alternating Copolymerization of Norbornene Anhydride and Epoxides. Polym. Chem. Jun. 2015, 3586-3590.
Bechtold, K.; Hillmyer, M. A.; Tolman, W. B. Perfectly Alternating Copolymer of Lactic Acid and Ethylene Oxide as a Plasticizing Agent for Polylactide. Macromolecules 2001, 34, 8641-8648.
Beckingham, B. S.; Sanoja, G. E.; Lynd, N. A. Simple and Accurate Determination of Reactivity Ratios Using a Nonterminal Model of Chain Copolymerization. Macromolecules 2015, 48, 6922-6930.
Branch, C. S.; van Poppel, L. G.; Bott, S. G.; Barron, A. R. Molecular Structure of (TBu)3A1[OUC(OPh)2]. J Chem Crystallogr 1999, 29, 993-996.
Chisholm, M. H.; Zhou, Z. Concerning the Mechanism of the Ring Opening of Propylene Oxide in the Copolymerization of Propylene Oxide and Carbon Dioxide to Give Poly(Propylene Carbonate). J. Am. Chem. Soc. 2004, 126, 11030-11039.
Darensbourg, D. J.; Chung, W.-C. Relative Basicities of Cyclic Ethers and Esters. Chemistry of Importance to Ring-Opening Co- and Terpolymerization Reactions. Polyhedron 2013, 58, 139-143.
DiCiccio, A. M.; Longo, J. M.; Rodríguez-Calero, G. G.; Coates, G. W. Development of Highly Active and Regioselective Catalysts for the Copolymerization of Epoxides with Cyclic Anhydrides: an Unanticipated Effect of Electronic Variation. J. Am. Chem. Soc. 2016, 138, 7107-7113.
Francis, J. A.; Bott, S. G.; Barron, A. R. Aluminium Compounds Containing Bidentate Ligands: Chelate Ring Size and Rigid Conformation Effects. J. Chem. Soc., Dalton Trans. 1998, 3305-3310.
Francis, J. A.; McMahon, C. N.; Bott, S. G.; Barron, A. R. Steric Effects in Aluminum Compounds Containing Monoanionic Potentially Bidentate Ligands: Toward a Quantitative Measure of Steric Bulk. Organometallics 1999, 18, 4399-4416.
Han, B.; Zhang, L.; Kyran, S. J.; Liu, B.; Duan, Z.; Darensbourg, D. J. Copolymerization of Carbon Dioxide and Cyclohexene Oxide Catalyzed by Chromium Complexes Bearing Semirigid [ONSO]-Type Ligands. J. Polym. Sci. A Polym. Chem. 2016, 54, 1938-1944.
Hosseini Nejad, E.; van Melis, C. G. W.; Vermeer, T. J.; Koning, C. E.; Duchateau, R. Alternating Ring-Opening Polymerization of Cyclohexene Oxide and Anhydrides: Effect of Catalyst, Cocatalyst, and Anhydride Structure. Macromolecules 2012, 45, 1770-1776.
Inoue, S. Copolymerization of Carbon Dioxide and Epoxide. In Carbon Dioxide as a Source of Carbon; Springer Netherlands: Dordrecht, 1987; pp. 331-337.

(Continued)

*Primary Examiner* — Gregory Listvoyb
(74) *Attorney, Agent, or Firm* — Meunier Carlin & Curfman LLC

(57) ABSTRACT

The present disclosure relates to copolymers and methods for copolymer preparation. Disclosed herein are high molecular weight copolymers of lactones and epoxides and methods for their synthesis.

7 Claims, 5 Drawing Sheets

(56) References Cited

OTHER PUBLICATIONS

Inoue, S. Copolymerization of Carbon Dioxide and Epoxide: Functionality of the Copolymer. Journal of Macromolecular Science: Part A—Chemistry 2006, 13, 651-664.

Inoue, S.; Koinuma, H.; Tsuruta, T. Copolymerization of Carbon Dioxide and Epoxide. Journal of Polymer Science Part A: Polymer Chem 2004, pp. 5561-5573.

Inoue, S.; Koinuma, H.; Tsuruta, T. Copolymerization of Carbon Dioxide and Epoxide with Organometallic Compounds. Makromol. Chem. 1969, 130, 210-220.

Lee, B. F.; Wolffs, M.; Delaney, K. T.; Sprafke, J. K.; Leibfarth, F. A.; Hawker, C. J.; Lynd, N. A. Reactivity Ratios and Mechanistic Insight for Anionic Ring-Opening Copolymerization of Epoxides. Macromolecules 2012, 45, 3722-3731.

Lehenmeier, M. W.; Bruckmeier, C.; Klaus, S.; Dengler, J. E.; Deglmann, P.; Ott, A.-K.; Rieger, B. Differences in Reactivity of Epoxides in the Copolymerisation with Carbon Dioxide by Zinc-Based Catalysts: Propylene Oxide Versus Cyclohexene Oxide. Chem. Eur. J. 2011, 17, 8858-8869.

Lindner, R.; Lejkowski, M. L.; Lavy, S.; Deglmann, P.; Wiss, K. T.; Zarbakhsh, S.; Meyer, L.; Limbach, M. Ring-Opening Polymerization and Copolymerization of Propylene Oxide Catalyzed by N-Heterocyclic Carbenes. ChemCatChem Jun. 2014, 618-625.

Liu, H.; Zhang, J. Research Progress in Toughening Modification of Poly(Lactic Acid). J. Polym. Sci. B Polym. Phys. 2011, 49, 1051-1083.

Mason, M. R.; Smith, J. M.; Bott, S. G.; Barron, A. R. Hydrolysis of Tri-Tert-Butylaluminum: the First Structural Characterization of Alkylalumoxanes [(R2A1)2O]N and (RA1O)N. J. Am. Chem. Soc. 1993, 115, 4971-4984.

McGrath, A. J.; Shi, W.; Rodriguez, C. G.; Kramer, E. J.; Hawker, C. J.; Lynd, N. A. Synthetic Strategy for Preparing Chiral Double-Semicrystalline Polyether Block Copolymers. Polym. Chem. Jun. 2015, 1465-1473.

McMahon, C. N.; Francis, J. A.; Bott, S. G.; Barron, A. R. Aluminium Compounds Containing Bidentate Ligands: Ligand Base Strength and Remote Geometric Control Over Degree of Association. J. Chem. Soc., Dalton Trans. 1999, 67-72.

McMahon, C. N.; Obrey, S. J.; Keys, A.; Bott, S. G.; Barron, A. R. Reaction of 1,3-Diols with Al(tBu)3 and Ga(tBu)3: Aluminium- and Gallium-Based Bifunctional Tetradentate Ligands. J. Chem. Soc., Dalton Trans. 2000, 2151-2161.

Munoz-Hernandez, M.-A.; Keizer, T. S.; Parkin, S.; Zhang, Y.; Atwood, D. A. Chelated Aluminum Alkoxides. J Chem Crystallogr 2000, 30, 219-222.

Munoz-Hernandez, M.-A.; Keizer, T. S.; Wei, P.; Parkin, S.; Atwood, D. A. Reactivity and Derivatization of Five-Coordinate, Chelated Aluminum. Inorganic Chemistry 2001, 40, 6782-6787.

Nakano, K.; Hashimoto, S.; Nakamura, M.; Kamada, T.; Nozaki, K. Stereocomplex of Poly(Propylene Carbonate): Synthesis of Stereogradient Poly(Propylene Carbonate) by Regio- and Enantioselective Copolymerization of Propylene Oxide with Carbon Dioxide. Angew. Chem. Int. Ed. 2011, 50, 4868-4871.

Nakano, R.; Ito, S.; Nozaki, K. Copolymerization of Carbon Dioxide and Butadiene via a Lactone Intermediate. Nature Chemistry Jun. 2014, 325-331.

Pitet, L. M.; Halt, S. B.; Lanyk, T. J.; Knauss, D. M. Linear and Branched Architectures From the Polymerization of Lactide with Glycidol. Macromolecules 2007, 40, 2327-2334.).

Raynaud, J.; Absalon, C.; Gnanou, Y.; Taton, D. N-Heterocyclic Carbene-Induced Zwitterionic Ring-Opening Polymerization of Ethylene Oxide and Direct Synthesis of α,ω-Difunctionalized Poly(ethylene oxide)s and Poly(ethylene oxide)-b-Poly(ϵ-caprolactone) Block Copolymers. J. Am. Chem. Soc. 2009, 131, 3201-3209.

Romain, C.; Zhu, Y.; Dingwall, P.; Paul, S.; Rzepa, H. S.; Buchard, A.; Williams, C. K. Chemoselective Polymerizations From Mixtures of Epoxide, Lactone, Anhydride, and Carbon Dioxide. J. Am. Chem. Soc. 2016, jacs.5b13070.

Ryan C Jeske; Angela M DiCiccio, A.; Coates, G. W. Alternating Copolymerization of Epoxides and Cyclic Anhydrides: an Improved Route to Aliphatic Polyesters; American Chemical Society, 2007; vol. 129, pp. 11330-11331.

Shi, W.; McGrath, A. J.; Li, Y.; Lynd, N. A.; Hawker, C. J.; Fredrickson, G. H.; Kramer, E. J. Cooperative and Sequential Phase Transitions in It-Poly(Propylene Oxide)-B-Poly(Ethylene Oxide)-B-It-Poly(Propylene Oxide) Triblock Copolymers. Macromolecules 2015, 48, 3069-3079.

Sudo, A.; Zhang, Y.; Endo, T. Anionic Alternating Copolymerization of Epoxide and Six-Membered Lactone Bearing Naphthyl Moiety. J. Polym. Sci. A Polym. Chem. 2010, 49, 619-624.

Tadokoro, A.; Takata, T.; Endo, T. Anionic Ring-Opening Alternating Copolymerization of a Bicyclic Bis(.Gamma.-Lactone) with an Epoxide: a Novel Ring-Opening Polymerization of a Monomer Containing a .Gamma.-Lactone Structure. Macromolecules 1993, 26, 4400-4406.

Tominaga, Y.; Shimomura, T.; Nakamura, M. Alternating Copolymers of Carbon Dioxide with Glycidyl Ethers for Novel Ion-Conductive Polymer Electrolytes. Polymer 2010, 51, 4295-4298.

Trott, G.; Saini, P. K.; Williams, C. K. Catalysts for CO2/Epoxide Ring-Opening Copolymerization. Phil. Trans. R. Soc. A 2016, 374, 20150085.

Van Zee, N. J.; Sanford, M. J.; Coates, G. W. Electronic Effects of Aluminum Complexes in the Copolymerization of Propylene Oxide with Tricyclic Anhydrides: Access to Well-Defined, Functionalizable Aliphatic Polyesters. J. Am. Chem. Soc. 2016, 138, 2755-2761.

Vandenberg, E. J. Organometallic Catalysts for Polymerizing Monosubstituted Epoxides. J. Polym. Sci. A Polym. Chem. 1960, 47, 486-489.

Wu, B.; Harlan, C. J.; Lenz, R. W.; Barron, A. R. Stereoregular Polymerization of (R, S)-Propylene Oxide by an Alumoxane-Propylene Oxide Complex †. Macromolecules 1997, 30, 316-318.

Xianhai Chen; Stephen P McCarthy, A.; Gross, R. A. Synthesis and Characterization of [L]-Lactide-Ethylene Oxide Multiblock Copolymers. Macromolecules 1997, 30, 4295-4301.

Xu, J.; Yang, J.; Ye, X.; Ma, C.; Zhang, G.; Pispas, S. Synthesis and Properties of Amphiphilic and Biodegradable Poly(ϵ-caprolactone-co-glycidol) Copolymers. J. Polym. Sci. Part A: Polym. Chem. 2015, 53, 846-853.

Zhang, D.; Xu, J.; Alcazar-Roman, L.; Greenman, L.; Cramer, C. J.; Hillmyer, M. A.; Tolman, W. B. Isotactic Polymers with Alternating Lactic Acid and Oxetane Subunits From the Endoentropic Polymerization of a 14-Membered Ring. Macromolecules 2004, 37, 5274-5281.

Zhang, X.-H.; Wei, R.-J.; Zhang, Y. Y.; Du, B.-Y.; Fan, Z.-Q. Carbon Dioxide/Epoxide Copolymerization via a Nanosized Zinc-Cobalt(III) Double Metal Cyanide Complex: Substituent Effects of Epoxides on Polycarbonate Selectivity, Regioselectivity and Glass Transition Temperatures. Macromolecules 2015, 48, 536-544.

Zhao, J.; Pahovnik, D.; Gnanou, Y.; Hadjichristidis, N. Sequential Polymerization of Ethylene Oxide, ϵ-Caprolactone and L-Lactide: a One-Pot Metal-Free Route to Tri- and Pentablock Terpolymers. Polym. Chem. May 2014, 3750-3753.

* cited by examiner

LACTONE-EPOXIDE STATISTICAL COPOLYMERS

CROSS REFERENCE TO RELATED APPLICATIONS

This application claims the benefit of U.S. Provisional Patent Application Ser. No. 62/472,187 filed Mar. 16, 2017, the disclosure of which is expressly incorporated herein by reference.

FIELD

The present disclosure relates to copolymers and methods for copolymer preparation.

BACKGROUND

Copolymerization is a versatile strategy for compositional control over structure property relationships. However, the scope of copolymerization typically encompasses strictly mechanistically compatible monomer classes such as pure (metha)crylate, or epoxide systems. There are many reports of the heterocopolymerization of disparate classes of monomers such as epoxides and carbon dioxide, and/or cyclic anhydrides, and examples of copolymerization between epoxides and lactones have been reported for lactones incapable of homopolymerization; copolymerization of carbon dioxide and butadiene has also been reported recently (Sudo, A. et al.; Zhang, Y.; Endo, T. Anionic Alternating Copolymerization of Epoxide and Six-Membered Lactone Bearing Naphthyl Moiety. *J. Polym. Sci. A Polym. Chem.* 2010, 49, 619-624; Tadokoro, A. et al. Anionic Ring-Opening Alternating Copolymerization of a Bicyclic Bis (Gamma-Lactone) with an Epoxide: a Novel Ring-Opening Polymerization of a Monomer Containing a Gamma-Lactone Structure. *Macromolecules* 1993, 26, 4400-4406; Nakano, R. et al. Copolymerization of Carbon Dioxide and Butadiene via a Lactone Intermediate. *Nature Chemistry* 2014, 6, 325-331).

Multicomponent polymerizations of an array of monomer species have also been reported, with the specificity of a zinc-based catalyst resulting in block copolymers formed from feed mixtures encompassing epoxide, lactone, anhydride, and carbon dioxide comonomers (Romain, C. et al. Chemoselective Polymerizations From Mixtures of Epoxide, Lactone, Anhydride, and Carbon Dioxide. *J. Am. Chem. Soc.* 2016, jacs.5b13070). Romain et al. reported that ε-caprolactone and cyclohexene oxide could be statistically copolymerized into block copolymers, but that heterosequences between the two monomers did not occur spontaneously. What is needed is a general synthetic strategy that would enable the direct copolymerization of epoxides and lactones that are both capable of homopropagation to high molecular weight. The compounds, compositions, and methods disclosed herein address these and other needs.

SUMMARY

Disclosed herein are lactone-epoxide copolymers and methods of preparing these lactone-epoxide copolymers to high molecular weight. The inventors have identified a method for preparing lactone-epoxide copolymers from epoxide and lactone monomers that are both capable of homopolymerization. In some embodiments, these methods for the preparation of lactone-epoxide copolymers use a catalyst that consists of aluminum, carbon, and oxygen, and specifically a catalyst synthesized from an alkylaluminum, a chelating agent, and water. These methods also allow for the preparation of high molecular weight lactone-epoxide copolymers.

In one aspect, disclosed herein is a copolymer comprising:

epoxide monomers and lactone monomers;
wherein the epoxide monomers and lactone monomers are both capable of homopolymerization; and
wherein the molecular weight of the copolymer is greater than 10 kg/mol.

In one embodiment, the lactone monomers are selected from DL-lactide and ε-caprolactone. In one embodiment, the lactone monomers are DL-lactide. In one embodiment, the lactone monomers are ε-caprolactone.

In one embodiment, the epoxide is selected from epihalohydrins such as epichlorohydrin, epibromohydrin, epifluorohydrin, and alkylene oxides such as hexylene oxide, butylene oxide, propylene oxide, or ethylene oxide, or glycidyl ethers such as methyl-, ethyl-, propyl-, allyl-, or phenyl-glycidyl ether. In one embodiment, the epoxide is epichlorohydrin. In one embodiment, the epoxide is butylene oxide. In one embodiment, the epoxide is propylene oxide. In one embodiment, the epoxide is ethylene oxide.

In one embodiment, the molar ratio of lactone monomer to epoxide monomer is from 1:100 to 100:1. In one embodiment, the molar ratio of lactone monomer to epoxide monomer is from 1:10 to 10:1. In one embodiment, the molar ratio of lactone monomer to epoxide monomer is from 1:5 to 5:1. In one embodiment, the molar ratio of lactone monomer to epoxide monomer is from 1:2 to 2:1. In one embodiment, the molar ratio of lactone monomer to epoxide monomer is about 1:1.

In one embodiment, the molecular weight of the copolymer is greater than 10 kg/mol. In one embodiment, the molecular weight of the copolymer is greater than 100 kg/mol. In one embodiment, the molecular weight of the copolymer is greater than 1,000 kg/mol. In one embodiment, the molecular weight of the copolymer is greater than 10,000 kg/mol.

In one embodiment, the copolymer comprises the formula:

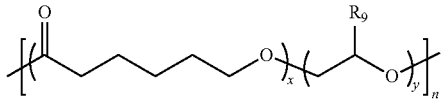

wherein:
$R_9$ is selected from hydrogen, alkyl, cycloalkyl, haloalkyl, aryl, or alkoxy;
x is a mole or weight percentage of a lactone monomer in the copolymer selected from 0.1 to 99.9%;
y is a mole or weight percentage of an epoxide monomer in the copolymer selected from 100−x %; and
n is an integer number of total repeat units selected from 50 to 500,000.

In one embodiment, the copolymer comprises the formula:

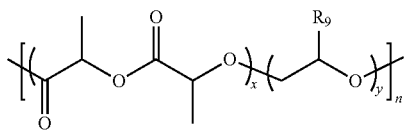

wherein:
$R_9$ is selected from hydrogen, alkyl, cycloalkyl, haloalkyl, aryl, or alkoxy;
x is a mole or weight percentage of a lactone monomer in the copolymer selected from 0.1 to 99.9%;
y is a mole or weight percentage of an epoxide monomer in the copolymer selected from 100-x %; and
n is an integer number of total repeat units selected from 50 to 500,000.

In one embodiment, the copolymer comprises the formula:

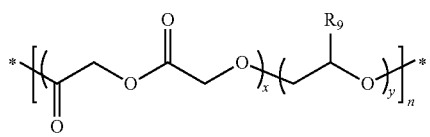

wherein:
$R_9$ is selected from hydrogen, alkyl, cycloalkyl, haloalkyl, aryl, or alkoxy;
x is a mole or weight percentage of a lactone monomer in the copolymer selected from 0.1 to 99.9%;
y is a mole or weight percentage of an epoxide monomer in the copolymer selected from 100-x %; and
n is an integer number of total repeat units selected from 50 to 500,000.

In one aspect, provided herein is a method of preparing a copolymer comprising:
mixing epoxide monomers and lactone monomers;
adding a catalyst comprising a group 13 element, carbon, hydrogen and oxygen to the epoxide monomers and lactone monomers; and allowing the epoxide monomers and lactone monomers to polymerize into a copolymer.

In one aspect, provided herein is a method of preparing a copolymer comprising:
mixing epoxide monomers and lactone monomers;
adding a catalyst comprising aluminum, carbon, hydrogen and oxygen to the epoxide monomers and lactone monomers; and
allowing the epoxide monomers and lactone monomers to polymerize into a copolymer.

In one aspect, provided herein is a method of preparing a copolymer comprising:
mixing epoxide monomers and lactone monomers;
adding a Vandenberg catalyst to the epoxide monomers and lactone monomers; and
allowing the epoxide monomers and lactone monomers to polymerize into a copolymer.

In one embodiment, the epoxide monomers and lactone monomers polymerize at a temperature from 35° C. to 50° C. In one embodiment, the epoxide monomers and lactone monomers polymerize at a temperature of about 40° C.

In one embodiment, the group 13 element is aluminum.

In one embodiment, the epoxide monomers and lactone monomers polymerize for at least 5 hours. In one embodiment, the epoxide monomers and lactone monomers polymerize for 5 hours to 30 hours. In one embodiment, the epoxide monomers and lactone monomers polymerize for 10 hours to 25 hours.

In one embodiment, the monomers are present in a molar ratio of lactone monomer to epoxide monomer wherein the molar ratio of x to y is from 1:100 to 100:1. In one embodiment, the monomers are present in a molar ratio of lactone monomer to epoxide monomer wherein the molar ratio of x to y is from 1:10 to 10:1. In one embodiment, the monomers are present in a molar ratio of lactone monomer to epoxide monomer wherein the molar ratio of x to y is from 1:5 to 5:1. In one embodiment, the monomers are present in a molar ratio of lactone monomer to epoxide monomer wherein the molar ratio of x to y is from 1:2 to 2:1. In one embodiment, the monomers are present in a molar ratio of lactone monomer to epoxide monomer wherein the molar ratio of x toy is about 1:1.

BRIEF DESCRIPTION OF THE DRAWINGS

The accompanying figures, which are incorporated in and constitute a part of this specification, illustrate several aspects described below.

DETAILED DESCRIPTION

Figure 1:
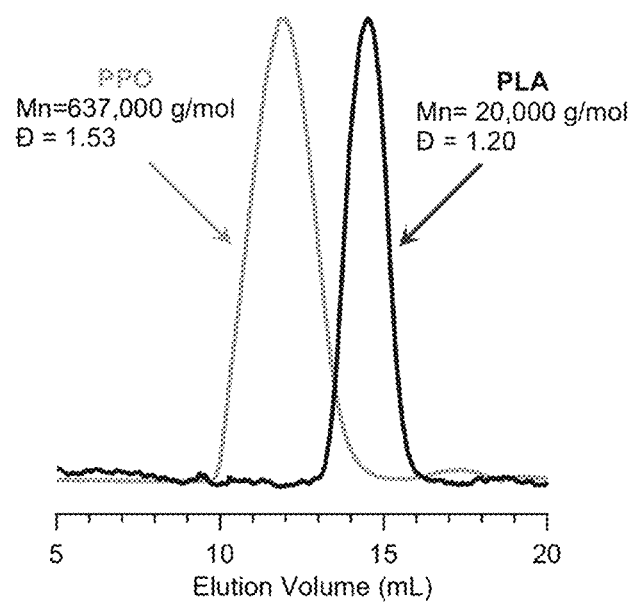
FIG. 1. Comparison of size exclusion chromatograms (light scattering intensity) of poly(propylene oxide) and poly(DL-lactide) synthesized using the same monomer-to-aluminum ratio of the Vandenberg catalyst. The polymerizations of lactones appear to be more controlled than those of the epoxides.

Disclosed herein are lactone-epoxide copolymers and methods of preparing these lactone-epoxide copolymers to high molecular weight. The inventors have identified a method for preparing lactone-epoxide copolymers from epoxide and lactone monomers that are both capable of homopolymerization. In some embodiments, these methods for the preparation of lactone-epoxide copolymers use a catalyst that consists of aluminum, carbon, and oxygen, and specifically a catalyst synthesized from an alkylaluminum, a chelating agent, and water. These methods also allow for the preparation of high molecular weight lactone-epoxide copolymers.

Reference will now be made in detail to the embodiments of the invention, examples of which are illustrated in the drawings and the examples. This invention may, however, be embodied in many different forms and should not be construed as limited to the embodiments set forth herein.

Unless defined otherwise, all technical and scientific terms used herein have the same meaning as commonly understood to one of ordinary skill in the art to which this disclosure belongs. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed.

The following definitions are provided for the full understanding of terms used in this specification.
Terminology As used herein, the article "a," "an," and "the" means "at least one," unless the context in which the article is used clearly indicates otherwise.

The term "about" as used herein when referring to a measurable value such as an amount, a percentage, and the like, is meant to encompass variations of ±20%, ±10%, ±5%, or ±1% from the measurable value.

As used herein, the terms "may," "optionally," and "may optionally" are used interchangeably and are meant to include cases in which the condition occurs as well as cases in which the condition does not occur.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"$Z^1$," "$Z^2$," "$Z^3$," and "$Z^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" as used herein refers to a non-aromatic hydrocarbon group and includes branched and unbranched, alkyl, alkenyl, or alkynyl groups.

The term "alkyl" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "alkoxy" as used herein is an alkyl group bound through a single, terminal ether linkage; that is, an "alkoxy" group can be defined as —$OZ^1$ where $Z^1$ is alkyl as defined above.

The term "alkenyl" as used herein is a hydrocarbon group of from 2 to 24 carbon atoms with a structural formula containing at least one carbon-carbon double bond. Asymmetric structures such as $(Z^1Z^2)C=C(Z^3Z^4)$ are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "alkynyl" as used herein is a hydrocarbon group of 2 to 24 carbon atoms with a structural formula containing at least one carbon-carbon triple bond. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol, as described below.

The term "aryl" as used herein is a group that contains any carbon-based aromatic group including, but not limited to, benzene, naphthalene, phenyl, biphenyl, phenoxybenzene, and the like. The term "heteroaryl" is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is included in the term "aryl," defines a group that contains an aromatic group that does not contain a heteroatom. The aryl or heteroaryl group can be substituted or unsubstituted. The aryl or heteroaryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above, and is included within the meaning of the term "cycloalkenyl," where at least one of the carbon atoms of the ring is substituted with a heteroatom such as, but not limited to, nitrogen, oxygen, sulfur, or phosphorus.

The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, nitro, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The term "aldehyde" as used herein is represented by the formula —C(O)H. Throughout this specification "C(O)" or "CO" is a short hand notation for C=O.

The terms "amine" or "amino" as used herein are represented by the formula —NZ$^1$Z$^2$, where Z$^1$ and Z$^2$ can each be substitution group as described herein, such as hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "carboxylic acid" as used herein is represented by the formula —C(O)OH. A "carboxylate" or "carboxyl" group as used herein is represented by the formula —C(O)O$^-$.

The term "ester" as used herein is represented by the formula —OC(O)Z$^1$ or —C(O)OZ$^1$, where Z$^1$ can be an alkyl, halogenated alkyl, alkenyl, alkynyl, aryl, heteroaryl, cycloalkyl, cycloalkenyl, heterocycloalkyl, or heterocycloalkenyl group described above.

The term "ether" as used herein is represented by the formula Z$^1$OZ$^2$, where Z$^1$ and Z$^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "ketone" as used herein is represented by the formula Z$^1$C(O)Z$^2$, where Z$^1$ and Z$^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "halide" or "halogen" as used herein refers to the fluorine, chlorine, bromine, and iodine.

The term "hydroxyl" as used herein is represented by the formula —OH.

The term "nitro" as used herein is represented by the formula —NO$_2$.

The term "silyl" as used herein is represented by the formula —SiZ$^1$Z$^2$Z$^3$, where Z$^1$, Z$^2$, and Z$^3$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl group described above.

The term "sulfonyl" is used herein to refer to the sulfo-oxo group represented by the formula —S(O)$_2$Z$^1$, where Z$^1$ can be hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "thiol" as used herein is represented by the formula —SH.

The term "thio" as used herein is represented by the formula —S—.

"$R^1$," "$R^2$," "$R^3$," "$R^n$," etc., where n is some integer, as used herein can, independently, possess one or more of the groups listed above. For example, if $R^1$ is a straight chain alkyl group, one of the hydrogen atoms of the alkyl group can optionally be substituted with a hydroxyl group, an alkoxyl group, an amine group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Unless stated to the contrary, a formula with chemical bonds shown only as solid lines and not as wedges or dashed lines contemplates each possible isomer, e.g., each enantiomer, diastereomer, and meso compound, and a mixture of isomers, such as a racemic or scalemic mixture.

Reference will now be made in detail to specific aspects of the disclosed materials, compounds, compositions, articles, and methods, examples of which are illustrated in the accompanying Examples and Figures.

Epoxide-Lactone Copolymers

In one aspect, disclosed herein is a copolymer comprising:
epoxide monomers and lactone monomers;
wherein the epoxide monomers and lactone monomers are both capable of homopolymerization; and
wherein the molecular weight of the copolymer is greater than 10 kg/mol.

In one embodiment, the lactone monomers are selected from DL-lactide or ε-caprolactone. In one embodiment, the lactone monomers are DL-lactide. In one embodiment, the lactone monomers are ε-caprolactone.

In one embodiment, the epoxide is selected from epichlorohydrin, butylene oxide, propylene oxide, or ethylene oxide. In one embodiment, the epoxide is epichlorohydrin. In one embodiment, the epoxide is butylene oxide. In one embodiment, the epoxide is propylene oxide. In one embodiment, the epoxide is ethylene oxide.

In one embodiment, the ratio of lactone monomer to epoxide monomer is about 1:1. In one embodiment, the ratio of lactone monomer to epoxide monomer is from 1:2 to 2:1. In one embodiment, the ratio of lactone monomer to epoxide monomer is from 1:20 to 20:1. In one embodiment, the ratio of lactone monomer to epoxide monomer is from 1:10 to 10:1. In one embodiment, the ratio of lactone monomer to epoxide monomer is from 1:5 to 5:1. In one embodiment, the ratio of lactone monomer to epoxide monomer is from 1:4 to 4:1. In one embodiment, the ratio of lactone monomer to epoxide monomer is from 1:3 to 3:1.

In one embodiment, the molecular weight of the copolymer is greater than 10 kg/mol. In one embodiment, the molecular weight of the copolymer is greater than 100 kg/mol. In one embodiment, the molecular weight of the copolymer is greater than 1,000 kg/mol. In one embodiment, the molecular weight of the copolymer is greater than 10,000 kg/mol.

In one embodiment, the copolymer comprises the formula:

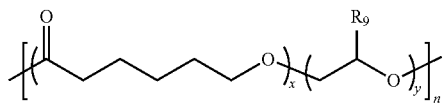

wherein:
$R_9$ is selected from hydrogen, alkyl, cycloalkyl, haloalkyl, aryl, or alkoxy;
x is a mole or weight percentage of a lactone monomer in the copolymer selected from 0.1 to 99.9%;
y is a mole or weight percentage of an epoxide monomer in the copolymer selected from 100–x %; and
n is an integer number of total repeat units selected from 50 to 500,000.

In one embodiment, the copolymer comprises the formula:

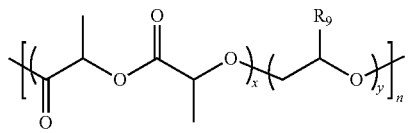

wherein:
$R_9$ is selected from hydrogen, alkyl, cycloalkyl, haloalkyl, aryl, or alkoxy;
x is a mole or weight percentage of a lactone monomer in the copolymer selected from 0.1 to 99.9%;
y is a mole or weight percentage of an epoxide monomer in the copolymer selected from 100–x %; and
n is an integer number of total repeat units selected from 50 to 500,000.

In some embodiments, the lactone to epoxide ratio is about 1:1. In some embodiments, there are small blocks of epoxides and/or lactones. In these embodiments, the number of epoxide or lactone in such blocks is small.

In one embodiment, the copolymer comprises the formula:

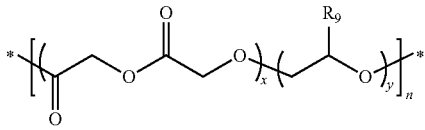

wherein:
$R_9$ is selected from hydrogen, alkyl, cycloalkyl, haloalkyl, aryl, or alkoxy;
x is a mole or weight percentage of a lactone monomer in the copolymer selected from 0.1 to 99.9%;
y is a mole or weight percentage of an epoxide monomer in the copolymer selected from 100–x %; and
n is an integer number of total repeat units selected from 50 to 500,000.

In some embodiments, the total repeat units (n) (of the lactone monomer and epoxide monomer) in the copolymer is at least 50 (for example, at least 500, at least 5,000, at least 50,000, at least 500,000).

In some embodiments, the lactone monomer in the copolymer can comprise individual monomer blocks independently selected from 1 to 100 monomers. In some embodiments, the lactone monomer in the copolymer can comprise individual monomer blocks independently selected from 1 to 500 monomers. In some embodiments, the epoxide monomer in the copolymer can comprise individual monomer blocks independently selected from 1 to 100 monomers. In some embodiments, the epoxide monomer in the copolymer can comprise individual monomer blocks independently selected from 1 to 500 monomers.

In one embodiment, the monomers are present in a molar ratio of lactone monomer to epoxide monomer wherein the molar ratio of x to y is from 1:100 to 100:1. In one embodiment, the monomers are present in a molar ratio of lactone monomer to epoxide monomer wherein the molar ratio of x to y is from 1:10 to 10:1. In one embodiment, the monomers are present in a molar ratio of lactone monomer to epoxide monomer wherein the molar ratio of x to y is from 1:5 to 5:1. In one embodiment, the monomers are present in a molar ratio of lactone monomer to epoxide monomer wherein the molar ratio of x to y is from 1:2 to 2:1. In one embodiment, the monomers are present in a molar ratio of lactone monomer to epoxide monomer wherein the molar ratio of x toy is about 1:1.

Epoxides

In some embodiments, epoxides (epoxide monomers) suitable for use in the present invention include those of Formula I:

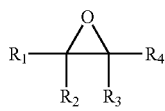

Formula I wherein $R^1$, $R^2$, $R^3$, and $R^4$ are independently selected from hydrogen, alkyl, cycloalkyl, haloalkyl, aryl, or alkoxy. In one embodiment, the epoxide monomer comprises from 2 to 12 carbon atoms.

In one embodiment, $R_1$ is hydrogen. In one embodiment, $R_1$ is methyl. In one embodiment, $R_1$ is ethyl. In one embodiment, $R_1$ is propyl. In one embodiment, $R_1$ is isopropyl.

In one embodiment, $R_2$ is hydrogen. In one embodiment, $R_2$ is methyl. In one embodiment, $R_2$ is ethyl. In one embodiment, $R_2$ is propyl. In one embodiment, $R_2$ is isopropyl.

In one embodiment, $R_3$ is hydrogen. In one embodiment, $R_3$ is methyl. In one embodiment, $R_3$ is ethyl. In one embodiment, $R_3$ is propyl. In one embodiment, $R_3$ is isopropyl.

In one embodiment, $R_4$ is hydrogen. In one embodiment, $R_4$ is methyl. In one embodiment, $R_4$ is ethyl. In one embodiment, $R_4$ is propyl. In one embodiment, $R_4$ is isopropyl.

Examples of epoxides include, for example, epichlorohydrin, butylene oxide, propylene oxide, and ethylene oxide, or mixtures thereof. Additional examples of epoxides can include 1-butene oxide, butadiene monoxide, 1-amylene oxide, styrene oxide, trimethylene oxide, 9,10-epoxystearic acid, isobutylene oxide, 2,3 butylene oxide, diphenylethylene oxide, cyclohexane epoxide, methyl cyclohexane epoxide, ethylene cyclohexane epoxide, or mixtures thereof.

In some embodiments, mixtures of epoxides can be used. In some embodiments, mixtures of lactones can be used in combination with mixtures of epoxides.

In one embodiment, the epoxide monomers comprise from about 5% to about 95% weight percent of the copolymer. In one embodiment, the epoxide monomers comprise from about 15% to about 85% weight percent of the copolymer. In one embodiment, the epoxide monomers comprise from about 25% to about 75% weight percent of the copolymer. In one embodiment, the epoxide monomers comprise from about 35% to about 65% weight percent of the copolymer. In one embodiment, the epoxide monomers comprise from about 45% to about 55% weight percent of the copolymer. In one embodiment, the epoxide monomers comprise about 50% weight percent of the copolymer.

Lactones

In some embodiments, lactones (lactone monomers) suitable for use in the present invention include those of Formula II:

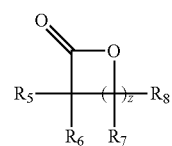

Formula II wherein $R_5$, $R_6$, $R_7$, and $R_8$ are independently selected from hydrogen, alkyl, cycloalkyl, haloalkyl, aryl, or alkoxy; and z is an integer from 3 to 6. In one embodiment, the epoxide monomer comprises from 2 to 12 carbon atoms.

In one embodiment, $R_5$ is hydrogen. In one embodiment, $R_5$ is methyl. In one embodiment, $R_5$ is ethyl. In one embodiment, $R_5$ is propyl. In one embodiment, $R_5$ is isopropyl.

In one embodiment, $R_6$ is hydrogen. In one embodiment, $R_6$ is methyl. In one embodiment, $R_6$ is ethyl. In one embodiment, $R_6$ is propyl. In one embodiment, $R_6$ is isopropyl.

In one embodiment, $R_7$ is hydrogen. In one embodiment, $R_7$ is methyl. In one embodiment, $R_7$ is ethyl. In one embodiment, $R_7$ is propyl. In one embodiment, $R_7$ is isopropyl.

In one embodiment, $R_8$ is hydrogen. In one embodiment, $R_8$ is methyl. In one embodiment, $R_8$ is ethyl. In one embodiment, $R_8$ is propyl. In one embodiment, $R_8$ is isopropyl.

In some embodiments, lactones (lactone monomers) suitable for use in the present invention include those of Formula III:

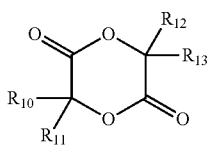

Formula III wherein $R_{10}$, $R_{11}$, $R_{12}$, and $R_{13}$ are independently selected form hydrogen or alkyl.

In one embodiment, $R_{10}$ is hydrogen. In one embodiment, $R_{10}$ is methyl.

In one embodiment, $R_{11}$ is hydrogen. In one embodiment, $R_{11}$ is methyl.

In one embodiment, $R_{12}$ is hydrogen. In one embodiment, $R_{12}$ is methyl.

In one embodiment, $R_{13}$ is hydrogen. In one embodiment, $R_{13}$ is methyl.

Examples of lactones include, for example, DL-lactide and ε-caprolactone. Additional lactones for use in the present invention include beta-propiolactone, delta-valerolactone, and lactones corresponding to the following acids: 2-methyl-3 hydroxypropionic acid; 3-hydroxynonanoic acid; 2-cyclopentyl-3-hydroxypropionic acid; 3-phenyl-3-hydroxypropionic acid; 2-n-butyl-3-cyclohexyl-3-hydroxypropionic acid; 4-benzyl-5-hydroxyvaleric acid; 4-(p-[n-octyl]phenyl)-6-hydroxycaproic acid; or mixtures thereof.

In some embodiments, mixtures of lactones can be used. In some embodiments, mixtures of lactones can be used in combination with mixtures of epoxides.

In one embodiment, the lactone monomers comprise from about 5% to about 95% weight percent of the copolymer. In one embodiment, the lactone monomers comprise from about 15% to about 85% weight percent of the copolymer. In one embodiment, the lactone monomers comprise from about 25% to about 75% weight percent of the copolymer. In one embodiment, the lactone monomers comprise from about 35% to about 65% weight percent of the copolymer. In one embodiment, the lactone monomers comprise from about 45% to about 55% weight percent of the copolymer. In one embodiment, the lactone monomers comprise about 50% weight percent of the copolymer.

Methods

In one aspect, provided herein is a method of preparing a copolymer comprising:
mixing epoxide monomers and lactone monomers;
adding a catalyst comprising a group 13 element, carbon, hydrogen and oxygen to the epoxide monomers and lactone monomers; and
allowing the epoxide monomers and lactone monomers to polymerize into a copolymer.

In one aspect, provided herein is a method of preparing a copolymer comprising:
mixing epoxide monomers and lactone monomers;
adding a catalyst comprising aluminum, carbon, hydrogen and oxygen to the epoxide monomers and lactone monomers; and
allowing the epoxide monomers and lactone monomers to polymerize into a copolymer.

In one aspect, provided herein is a method of preparing a copolymer comprising:
mixing epoxide monomers and lactone monomers;
adding a Vandenberg catalyst to the epoxide monomers and lactone monomers; and
allowing the epoxide monomers and lactone monomers to polymerize into a copolymer.

In one aspect, provided herein is a method of preparing a copolymer comprising:
mixing epoxide monomers and lactone monomers;
adding a catalyst consisting of an aluminum, carbon, hydrogen and oxygen to the epoxide monomers and lactone monomers; and
allowing the epoxide monomers and lactone monomers to polymerize into a copolymer.

In one embodiment, the epoxide monomers and lactone monomers polymerize at a temperature ranging from 40° C. to 50° C. In one embodiment, the epoxide monomers and lactone monomers polymerize at a temperature of about 45° C.

In one embodiment, the epoxide monomers and lactone monomers polymerize for at least 5 hours. In one embodiment, the epoxide monomers and lactone monomers polymerize for 5 hours to 30 hours. In one embodiment, the epoxide monomers and lactone monomers polymerize for 10 hours to 25 hours.

In some embodiments, the copolymerization reaction goes to completion in less than 72 hours (for example less than 5 hours, less than 10 hours, less than 15 hours, less than 20 hours, less than 30 hours, less than 40 hours, less than 50 hours, less than 60 hours, less than 72 hours).

In one embodiment, the lactone monomers are selected from DL-lactide or ε-caprolactone. In one embodiment, the lactone monomers are DL-lactide. In one embodiment, the lactone monomers are ε-caprolactone.

In one embodiment, the epoxide is selected from epichlorohydrin, butylene oxide, propylene oxide, or ethylene oxide. In one embodiment, the epoxide is epichlorohydrin. In one embodiment, the epoxide is butylene oxide. In one embodiment, the epoxide is propylene oxide. In one embodiment, the epoxide is ethylene oxide.

In one embodiment, the ratio of lactone monomer to epoxide monomer is about 1:1. In one embodiment, the ratio of lactone monomer to epoxide monomer is from 1:2 to 2:1. In one embodiment, the ratio of lactone monomer to epoxide monomer is from 1:100 to 100:1. In one embodiment, the ratio of lactone monomer to epoxide monomer is from 1:20 to 20:1. In one embodiment, the ratio of lactone monomer to epoxide monomer is from 1:10 to 10:1. In one embodiment, the ratio of lactone monomer to epoxide monomer is from 1:5 to 5:1. In one embodiment, the ratio of lactone monomer to epoxide monomer is from 1:4 to 4:1. In one embodiment, the ratio of lactone monomer to epoxide monomer is from 1:3 to 3:1.

In one embodiment, the molecular weight of the copolymer is greater than 10 kg/mol. In one embodiment, the molecular weight of the copolymer is greater than 100 kg/mol. In one embodiment, the molecular weight of the copolymer is greater than 1,000 kg/mol. In one embodiment, the molecular weight of the copolymer is greater than 10,000 kg/mol.

In one embodiment, the copolymer comprises the formula:

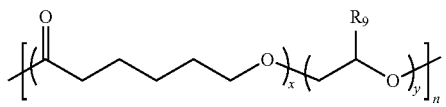

wherein:
$R_9$ is selected from hydrogen, alkyl, cycloalkyl, haloalkyl, aryl, or alkoxy;
x is a mole or weight percentage of a lactone monomer in the copolymer selected from 0.1 to 99.9%;
y is a mole or weight percentage of an epoxide monomer in the copolymer selected from 100–x %; and
n is an integer number of total repeat units selected from 50 to 500,000.

In one embodiment, the copolymer comprises the formula:

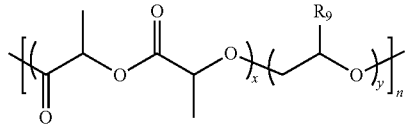

wherein:
$R_9$ is selected from hydrogen, alkyl, cycloalkyl, haloalkyl, aryl, or alkoxy;
x is a mole or weight percentage of a lactone monomer in the copolymer selected from 0.1 to 99.9%;
y is a mole or weight percentage of an epoxide monomer in the copolymer selected from 100–x %; and
n is an integer number of total repeat units selected from 50 to 500,000.

In one embodiment, the copolymer comprises the formula:

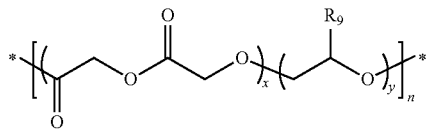

wherein:

$R_9$ is selected from hydrogen, alkyl, cycloalkyl, haloalkyl, aryl, or alkoxy;

x is a mole or weight percentage of a lactone monomer in the copolymer selected from 0.1 to 99.9%;

y is a mole or weight percentage of an epoxide monomer in the copolymer selected from 100−x %; and n is an integer number of total repeat units selected from 50 to 500,000.

The lactone-epoxide copolymers of the present invention are useful in a number of applications. The lactone-epoxide copolymers may be used for the production of a variety of rubbers, tubing, coated fabrics, and the like. Additionally, the lactone-epoxide copolymers are used in the productions of pharmaceuticals. The lactone-epoxide copolymers are also applied when a biodegradable copolymer is needed, such as environmental and biomedical applications.

Vandenberg Catalyst

The Vandenberg catalyst includes an initiator and a coinitiator. The initiator is chosen from organometallic compounds such as the compounds of the trialkylaluminium type, in particular trimethylaluminum, triethylaluminium or tributylaluminium, compounds or dialkylzinc or diarylzinc species, in particular diethylzinc or diphenylzinc. The coinitiator is generally water, and the mixture may also contain diethyl ether as diluent.

In one embodiment, the Vandenberg catalyst is a mixture of triethylaluminum and water, made under very precise and carefully controlled conditions to insure that an entire hydration of the triethyl aluminum does not occur. In one embodiment, the ratio of triethylaluminum to water is about 2:1. In one embodiment, a range of ratios from about 1.5:1 to about 2.5:1 is used. This catalyst is an extremely effective catalyst for the ring opening polymerization.

In one embodiment, the Vandenberg catalyst is a mixture of triethylaluminum, water, and a 1,3-di-one species such as acetylacetone. In one embodiment, the ratio of triethylaluminum to acetylacetone is about 2:1, and the ratio of triethylaluminum to water is about 2:1. In one embodiment, a range of ratios from about 1.5:1 to about 2.5:1 is used.

In one embodiment, the Vandenberg catalyst concentration in the reaction is from about 0.0001% weight percent to about 5% weight percent. In one embodiment, the Vandenberg catalyst concentration in the reaction is from about 0.001% weight percent to about 2% weight percent. In one embodiment, the Vandenberg catalyst concentration in the reaction is from about 0.01% weight percent to about 1% weight percent.

In one embodiment, ratio of the monomers (lactone monomers and epoxide monomers) to Vandenberg catalyst ratio (or the monomer-to-aluminum ratio) is from 100:1 to 250:1. In one embodiment, ratio of the monomers (lactone monomers and epoxide monomers) to Vandenberg catalyst ratio (or the monomer-to-aluminum ratio) is about 100. In one embodiment, ratio of the monomers (lactone monomers and epoxide monomers) to Vandenberg catalyst ratio (or the monomer-to-aluminum ratio) is about 120. In one embodiment, ratio of the monomers (lactone monomers and epoxide monomers) to Vandenberg catalyst ratio (or the monomer-to-aluminum ratio) is about 140. In one embodiment, ratio of the monomers (lactone monomers and epoxide monomers) to Vandenberg catalyst ratio (or the monomer-to-aluminum ratio) is about 160. In one embodiment, ratio of the monomers (lactone monomers and epoxide monomers) to Vandenberg catalyst ratio (or the monomer-to-aluminum ratio) is about 180. In one embodiment, ratio of the monomers (lactone monomers and epoxide monomers) to Vandenberg catalyst ratio (or the monomer-to-aluminum ratio) is about 200. In one embodiment, ratio of the monomers (lactone monomers and epoxide monomers) to Vandenberg catalyst ratio (or the monomer-to-aluminum ratio) is about 225. In one embodiment, ratio of the monomers (lactone monomers and epoxide monomers) to Vandenberg catalyst ratio (or the monomer-to-aluminum ratio) is about 250.

Vandenberg catalysts can be found, for example, in U.S. Pat. Nos. 5,075,389, 3,219,591, and 5,700,880, the entirety of which are incorporated herein by reference for all purposes.

EXAMPLES

The following examples are set forth below to illustrate the compounds, compositions, methods, and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Example 1. Statistical Copolymerization of Epoxides and Lactones

Copolymerization provides a modular strategy to wield compositional control of structure-property relationships in polymeric materials. In this example, new synthetic concepts and materials were explored by investigating the simultaneous statistical copolymerization of lactones and epoxides by utilizing the classical Vandenberg catalyst as polymerization initiator. The Vandenberg catalyst was developed for epoxide polymerization. In this example, the efficiency of the Vandenberg catalyst was first demonstrated for DL-lactide polymerization, which was more controlled than epoxide polymerization in terms of molecular weight, and molecular weight distribution. Copolymerization between monomer pairs selected from among two common lactones (DL-lactide, ε-caprolactone) with common epoxides (epichlorohydrin, butylene oxide, propylene oxide, ethylene oxide) were then carried out. Copolymers were created up to high molecular weights up to 10 Mg/mol (and over 10 Mg/mol as well). The resultant materials exhibited thermal transitions that were intermediate of their corresponding pure homopolymers. Unique spectroscopic evidence for copolymer formation could be identified in the $^1$H NMR spectra of copolymers containing DL-lactide due to the presence of distinct ester-ether dyad signals being clearly evident. Moreover, the amorphous copolymers formed optically clear films. Reactivity ratios were determined for the copolymerization of lactide and propylene oxide by the method reported by Meyer and Lowry, and also Beckingham et al. The reactivity ratios determined via both methods were consistent with a gradient copolymer with propylene oxide (PO) being the more preferred monomer, and lactide (LA)

being less preferred: $r_{PO}$=2.22±0.13, and $r_{LA}$=0.21±0.02. The copolymerization between ε-caprolactone and propylene oxide was also monitored by $^1$H NMR spectroscopy. A greater reactivity for propylene oxide was evident, but reversibility of the ε-caprolactone under these reaction conditions prevented determination of accurate reactivity ratios. However, Meyer-Lowry analysis provides estimates of $r_{PO}$=2.17±0.04, and $r_{CL}$=0.08±0.01. Polymer degradation, and analysis of the products of degradation were investigated. This is the first known report of the general statistical copolymerization of common lactones and epoxides into single copolymer backbones.

The development of new polymer architectures is driven by advances in synthetic methodology and catalysis. Expansion of the scope of structural possibilities in polymeric materials enhances diversity in terms of architecture, composition, and stereochemistry that drives our knowledge of polymer physics and properties for technological applications. Copolymerization is a versatile strategy for compositional control over structure property relationships. However, the scope of copolymerization typically encompasses strictly mechanistically compatible monomer classes such as pure (meth)acrylate, or epoxide systems. There are many reports of the heterocopolymerization of disparate classes of monomers such as epoxides and carbon dioxide,[1-11] and/or cyclic anhydrides,[12-16] and examples of copolymerization between epoxides and lactones have been reported for lactones incapable of homopolymerization.[17,18]

Significantly, Chen et al. conducted copolymerizations of ethylene oxide and lactide using a variety of organometallic species and concluded that multiblock architectures resulted based on spectroscopic and thermal evidence (Xianhai Chen; Stephen P McCarthy, A.; Gross, R. A. Synthesis and Characterization of [L]-Lactide-Ethylene Oxide Multiblock Copolymers. *Macromolecules* 1997, 30, 4295-4301.). Pitet et al. successfully synthesized branched poly(lactide) via copolymerization of glycidol with lactide (Pitet, L. M.; Halt, S. B.; Lanyk, T. J.; Knauss, D. M. Linear and Branched Architectures From the Polymerization of Lactide with Glycidol. *Macromolecules* 2007, 40, 2327-2334.). Others have reported sequential block, and statistical copolymers of specific epoxide/lactones pairs (Zhao, J.; Pahovnik, D.; Gnanou, Y.; Hadjichristidis, N. Sequential Polymerization of Ethylene Oxide, ε-Caprolactone and L-Lactide: a One-Pot Metal-Free Route to Tri- and Pentablock Terpolymers. *Polym. Chem.* 2014, 5, 3750-3753; Raynaud, J.; Absalon, C.; Gnanou, Y.; Taton, D. N-Heterocyclic Carbene-Induced Zwitterionic Ring-Opening Polymerization of Ethylene Oxide and Direct Synthesis of α,ω-Difunctionalized Poly (ethylene oxide)s and Poly(ethylene oxide)-b-Poly(ε-caprolactone) Block Copolymers. *J. Am. Chem. Soc.* 2009, 131, 3201-3209; Xu, J.; Yang, J.; Ye, X.; Ma, C.; Zhang, G.; Pispas, S. Synthesis and Properties of Amphiphilic and Biodegradable Poly(ε-caprolactone-co-glycidol) Copolymers. *J. Polym. Sci. Part A: Polym. Chem.* 2015, 53, 846-853; Lindner, R.; Lejkowski, M. L.; Lavy, S.; Deglmann, P.; Wiss, K. T.; Zarbakhsh, S.; Meyer, L.; Limbach, M. Ring-Opening Polymerization and Copolymerization of Propylene Oxide Catalyzed by N-Heterocyclic Carbenes. *ChemCatChem* 2014, 6, 618-625).

A copolymerization of carbon dioxide and butadiene has also been reported recently.[19] Multicomponent polymerizations of an array of monomer species have also been reported, with the specificity of a zinc-based catalyst resulting in block copolymers formed from feed mixtures encompassing epoxide, lactone, anhydride, and carbon dioxide comonomers.[20] Romain et al. reported that ε-caprolactone and cyclohexene oxide could be statistically copolymerized into block copolymers, but that heterosequences between the two monomers did not occur spontaneously. A synthetic strategy that would enable the direct copolymerization of epoxides and lactones that are both capable of homopropagation has not been reported. In this example, the general copolymerization of epoxides and lactones into single heterocopolymer poly(ester-co-ether) backbones are shown in Scheme 1.

Direct copolymerization of heterocyclic monomer systems such as epoxides and lactones offers a versatile approach to the synthesis of multifunctional polymer materials with tunable physical properties. Relative reactivity toward polymerization between multiple monomers is a central concern for the synthesis of multifunctional materials.[21,22] For heterocyclic monomers, the driving force for polymerization is generally ring strain. For many systems, particularly epoxides, ring strain does not depend strongly on the structure of an additional substituent, provided that it does not otherwise interfere in the polymerization reaction. At relatively equivalent ring strain, during an active copolymerization, monomer incorporation statistics (i.e., reactivity ratios) can be strongly affected by the Lewis basicities of the monomers, which, in part, dictates their coordination equilibria for the propagation center of the polymerization; the first step to monomer enchainment.[21,23] Thus, in a similar manner as the (meth)acrylates, true compositional control of structure-property relationships may be realized in the copolymerization of heterocyclic monomers. Additionally, many of these heterocyclic systems copolymerize via simplified non-terminal copolymerization kinetics, which facilitates gaining a quantitative understanding of statistical copolymer sequence.[22] Heterocyclic monomers also provide an additional degree of structural variability over vinylic systems in terms of the introduction of not only side-chain functionality, but also through the introduction of non-carbon backbone heteroatoms. The introduction of heteroatoms can provide numerous advantages such as, in the case of oxygen, a high bond strength, low rotational barrier, low Van der Waals interaction, Lewis basicity for association of ionic species, and variation of hydrophilicity. For monomer systems with chiral centers such as many terminal epoxides or substituted lactones, the tunability of polymer tacticity either by stereospecific catalysis or control of enantiopurity of the monomer feed, may further be used to tune physical, thermal, and mechanical properties.[24,25] Taken together, these properties provide a class of materials that are well suited for elastomers, electrolytes, and biocompatible and/or biomedical materials among many other possibilities. In this example, the classical Vandenberg catalyst was used to create copolymers from disparate families of heterocyclic monomers as shown in Scheme 1.

Scheme 1. The copolymerization of lactones and epoxides can be accomplished using the classical Vandenberg catalyst

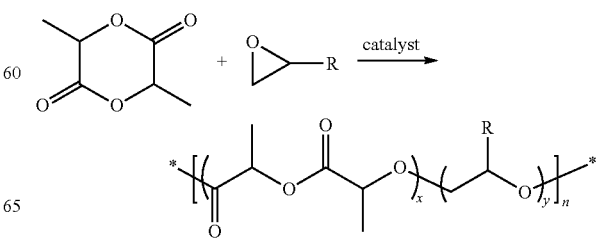

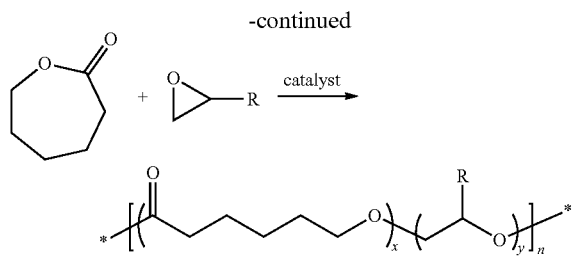

The Vandenberg catalyst was chosen as the catalyst/initiator design ansatz due to its high activity for the polymerization of epoxides to high molecular weight, regio- and stereoregulation, and ease of synthesis and use. While the catalyst is not air-stable, monomers can be taken directly from chemical suppliers without further rigorous purification as required for many ionic polymerization techniques. The Vandenberg catalyst system has some disadvantages to its use in fundamental studies. These limitations are derived from the statistical nature of the catalyst synthesis resulting in a distribution of species. A structure was proposed by Vandenberg according to the stoichiometry of reactants, and the moles of gas evolved from release of the alkyl groups on aluminum during synthesis.[26] This idealized structure is shown in Scheme 2a. It should be noted that this structure is one of many possibilities in a distribution of products, and a structure such as this with large degrees of rotational freedom is not consistent with the isoselectivity of the polymerization. The Vandenberg catalyst is most likely a combination of catalytically active substances. Based on foundational work by Atwood,[27-29] and Barron,[30-36] it is proposed that the basic catalytic structure of the Vandenberg catalyst is likely closer to the structure shown in Scheme 2a that lacks the rotational freedom of structure Scheme 2b.

Scheme 2. (a) Originally proposed structure for the Vandenberg catalyst and a renewed stoichiometrically representative structure (b).

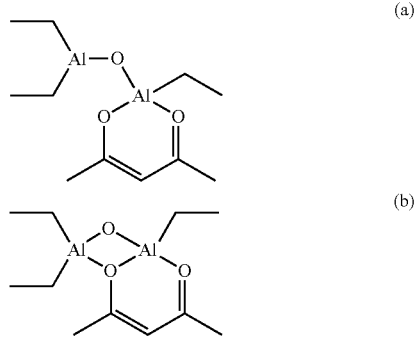

Given the importance of polyesters such as polylactide as renewable-resource derived thermoplastics and degradable and/or biocompatible scaffolds, significant research effort has focused on developing methods to modify properties.[37] This synthetic approach enables the facile combination of properties from disparate polymers into single material embodiments with little synthetic overhead. In this example, synthetic concepts were investigated toward incorporating common lactones such as DL-lactide and ε-caprolactone with alkylene oxides such as ethylene oxide, propylene oxide, butylene oxide, and epichlorohydrin into single heterocopolymer architectures.

Methods

Materials.

Chemicals were obtained from Sigma-Aldrich, Fisher Scientific and TCI-America, Inc. and were used without further purification unless otherwise specified. Toluene and diethyl ether were drawn from a dry solvent system (J. C. Meyer) and used immediately afterwards. Epichlorohydrin, deuterated chloroform ($CDCl_3$) and deuterated methylene chloride ($CD_2Cl_2$) were purchased from Cambridge Isotope Laboratories, Inc. DL-Lactide was recrystallized in ethyl acetate, and all epoxides except ethylene oxide were dried over calcium hydride and degassed via three freeze-pump thaw cycles. These monomers were kept in an inert nitrogen environment until use. Ethylene oxide was purchase from Airgas (99.9%+) and condensed into a tared and dried high-pressure round-bottom flask fitted with Chemglass stopcocks.

Measurements & Characterization.

$^1H$ and $^{13}C$ NMR spectroscopy was carried out on a Agilent MR 400 MHz spectrometer, Varian DirectDrive 400 MHz, Varian Inova 500 MHz, and Varian Mercury 400 MHz. Most materials were dissolved in deuterated chloroform except when specified. Differential scanning calorimetry (DSC) was performed using a TA Instruments Q2000 MDSC equipped with an autosampler. The temperature ranged from −70 to +150° C. and was controlled by heating and cooling at 10 K/min. The second scan was collected in order to reduce artifacts associated with the thermal history of the sample. Size exclusion chromatography (SEC) was collected on an Agilent system with a 1260 Infinity isocractic pump, degasser, and thermostated column chamber held at 30° C. containing Agilent PLgel 10 μm MIXED-B and 5 μm MIXED-C columns with a combined operating range of 200-10,000,000 g/mol relative to polystyrene standards. Chloroform with 50 ppm amylene was used as the mobile phase at 0.5 mL/min for the copolymer measurement and tetrahydrofuran at 0.5 mL/min for polylactide. Measurement of polymer concentration, molecular weight, and viscosity was provided by a suite of detectors from Wyatt Technologies. Static light scattering was measured using a DAWN HELEOS II Peltier system, differential refractive index was measured with an Optilab TrEX, and differential viscosity was measured using a Viscostar II.

Synthesis of the Aluminum Chelate (Vandenberg) Catalyst.

To an 80 mL solution of cold 0.5M triethylaluminum in diethyl ether was added dropwise 0.5 equivalent of dry acetyl acetone. The reaction mixture was stirred and vented under an inert nitrogen purge until all gas evolution ceased. 0.5 equivalents of deionized water was added slowly to the rapidly stirring solution on ice under inert nitrogen purge. The solution was allowed to warm and stir overnight before use.

Synthesis of poly[(DL-lactide)]

DL-Lactide (2 g) was added to a dry reaction vial under nitrogen with a Teflon-coated stir-bar. 6 mL of dichloromethane taken from the bottle was added to the reaction mixture after which the vial was sealed to maintain an inert nitrogen atmosphere. The catalyst was added from a stock solution to target monomer-to-aluminum ratios of 35, 87, 173, 260, and 350. The solvent in these polymerizations was used as received. The reaction was heated at 45° C. and magnetically stirred for 48 hours. Conversion of DL-lactide was quantitative. Molecular weight was determined by SEC using the differential refractive index, and multi-angle light scattering detectors with a (dn/dc)=0.042 mL/g for PLA in the tetrahydrofuran mobile phase.

Synthesis of poly[(DL-lactide)-co-(epichlorohydrin)]

DL-Lactide (1 g) was added to a reaction vial after which the corresponding molar amount of epichlorohydrin was added. To this monomer mixture, 6 mL of dry dichloromethane was added after which the vial was sealed under an inert nitrogen atmosphere. The catalyst was added from a stock solution to target a monomer-to-aluminum ratio of 169, 182 and 157 for LA:ECH ratios of 1:1, 1:2 and 2:1. The reaction was stirred and heated at 40° C. for 24 h. As the reaction proceeded the viscosity increased dramatically. The polymerization was terminated with a mixture of dichloromethane and methanol. The polymer was then dried on a rotary evaporator at 150 mbar and 45° C. to remove most solvent before being transferred to be vacuum dried. The sample at this time was weight to determine yield, and was used for NMR and GPC analysis.

$^1$H NMR (400 MHz, 1:2 CD$_2$Cl$_2$:CDCl$_3$): δ 5.2-5.1, 4.3 (—C(=O)CH(CH$_3$)—O—), δ 1.6-1.4 (—C(=O)CH(CH$_3$)—O—), δ 3.8-3.6 (—OCH$_2$CH(CH$_2$Cl)O—). $^{13}$C NMR (100 MHz, CDCl$_3$): δ 168.6, 80.0, 70.5, 69.9, 44.6, 21.3, 17.6

Synthesis of poly[(DL-lactide)-co-(butylene oxide)]

D,L-Lactide (1 g) was added to a reaction vial after which the corresponding molar amount of butylene oxide was added to create a ratio of 1:1, 1:2 and 2:1. To this monomer mixture, 6 mL of dry dichloromethane was added after which the vial was sealed and kept in an inert nitrogen atmosphere. The catalyst was added from a stock solution to target a monomer-to-aluminum ratio of 185, 208 and 164 for LA:BO ratios of 1:1, 1:2 and 2:1. The reaction was then stirred and heated to 40° C. for 24 h. As the reaction increased the viscosity dramatically to quench the reaction a mixture of dichloromethane and methanol was added to ensure all the chains become terminated. The polymer was then rotovaped at 150 mbar and 45° C. to remove most solvent before being transferred to be vacuum dried. The sample at this time was weight to determine yield, and was used for NMR and GPC analysis $^1$H NMR (400 MHz, CDCl$_3$): δ 5.3-5.1, 4.4 (—C(=O)CH(CH$_3$)O—), δ 1.6-1.4 (—C(=O)CH(CH$_3$)O—), δ 3.7-3.3 (—OCH$_2$CH(CH$_2$CH$_3$)O—), δ 1.6 (—OCH$_2$CH(CH$_2$CH$_3$)O—), δ 0.9 (—OCH$_2$CH(CH$_2$CH$_3$)O—). $^{13}$C NMR (100 MHz, CDCl$_3$): δ 169.2, 81.0, 72.5, 69.1, 24.9, 20.3, 16.8, 10.0.

Synthesis of poly[(DL-lactide)-co-(propylene oxide)]

D,L-Lactide (1 g) was added to a reaction vial after which the corresponding molar amount of propylene oxide was added to create a ratio of 1:1, 1:2 and 2:1. To this monomer mixture, 6 mL of dry dichloromethane was added after which the vial was sealed and kept in an inert nitrogen atmosphere. The catalyst was added from a stock solution to target a monomer-to-aluminum ratio of 198, 230 and 173 for LA:PO ratios of 1:1, 1:2 and 2:1. The reaction was then stirred and heated to 40° C. for 24 h. As the reaction increased the viscosity dramatically to quench the reaction a mixture of dichloromethane and methanol was added to ensure all the chains become terminated. The polymer was then rotovaped at 150 mbar and 45° C. to remove most solvent before being transferred to be vacuum dried. The sample at this time was weight to determine yield, and was used for NMR and GPC analysis $^1$H NMR (400 MHz, CDCl$_3$): δ 5.2-5.1, 4.4 (—C(=O)CH(CH$_3$)O—), δ 1.6-1.5 (—C(=O)CH(CH$_3$)O—), δ 3.8-3.3 (—OCH$_2$CH(CH$_3$)O—), δ 1.1 (—OCH$_2$CH$_1$(CH$_3$)O—). $^{13}$C NMR (100 MHz, CDCl$_3$): δ 169.5, 75.7, 73.6, 69.3, 52.4, 20.3, 18.25, 17.45, 16.8

Synthesis of poly[(ε-caprolactone)-co-(epichlorohydrin)]

ε-caprolactone (1 g) was added to a reaction vial after which the corresponding molar amount of epichlorohydrin was added to create a ratio of 1:1, 1:2 and 2:1. To this monomer mixture, 6 mL of dry dichloromethane was added after which the vial was sealed and kept in an inert nitrogen atmosphere. The catalyst was added from a stock solution to target a monomer-to-aluminum ratio of 194, 200 and 187 for EL:ECH ratios of 1:1, 1:2 and 2:1. The reaction was then stirred and heated to 40° C. for 24 h. As the reaction increased the viscosity dramatically to quench the reaction a mixture of dichloromethane and methanol was added to ensure all the chains become terminated. The polymer was then rotovaped at 150 mbar and 45° C. to remove most solvent before being transferred to be vacuum dried. The sample at this time was weight to determine yield, and was used for NMR and GPC analysis. $^1$H NMR (400 MHz, 1:2 CD$_2$Cl$_2$:CDCl$_3$): δ 4.0 (—C(=O)CH$_2$CH$_2$CH$_2$CH$_2$CH$_2$O—), δ 2.3 (—C(=O)CH$_2$CH$_2$CH$_2$CH$_2$CH$_2$O—), δ 1.7-1.6 (—C(=O)CH$_2$CH$_2$CH$_2$CH$_2$CH$_2$O—), δ 1.4-1.3 (—C(=O)CH$_2$CH$_2$CH$_2$CH$_2$CH$_2$O—), δ 3.8-3.6 (—OCH$_2$CH(CH$_2$Cl)O—), δ 1.53 (—OCH$_2$CH(CH$_2$Cl)O—). $^{13}$C NMR (100 MHz, CDCl$_3$): δ 174.1, 79.8, 70.3, 64.8, 44.5, 34.8, 29.1, 26.2, 26.5.

Synthesis of poly[(ε-caprolactone)-co-(butylene oxide)]

ε-caprolactone (1 g) was added to a reaction vial after which the corresponding molar amount of butylene oxide was added to create a ratio of 1:1, 1:2 and 2:1. To this monomer mixture, 6 mL of dry dichloromethane was added after which the vial was sealed and kept in an inert nitrogen atmosphere. The catalyst was added from a stock solution to target a monomer-to-aluminum ratio of 185, 208 and 164 for EL:BO ratios of 1:1, 1:2 and 2:1. The reaction was then stirred and heated to 40° C. for 24 h. As the reaction increased the viscosity dramatically to quench the reaction a mixture of dichloromethane and methanol was added to ensure all the chains become terminated. The polymer was then rotovaped at 150 mbar and 45° C. to remove most solvent before being transferred to be vacuum dried. The sample at this time was weight to determine yield, and was used for NMR and GPC analysis. $^1$H NMR (400 MHz, CDCl$_3$): δ 4.2 (—C(=O)CH$_2$CH$_2$CH$_2$CH$_2$CH$_2$O—), δ 2.3 (—C(=O)CH$_2$CH$_2$CH$_2$CH$_2$CH$_2$O—), δ 1.7-1.5 (—C(=O)CH$_2$CH$_2$CH$_2$CH$_2$CH$_2$O—), δ 1.4-1.3 (—C(=O)CH$_2$CH$_2$CH$_2$CH$_2$CH$_2$O—), δ 3.7-3.3 (—OCH$_2$CH(CH$_2$CH$_3$)O—), δ 1.5 (—OCH$_2$CH$_1$(CH$_2$CH$_3$)O—), δ 0.9 (—OCH$_2$CH(CH$_2$CH$_3$)O—). $^{13}$C NMR (100 MHz, CDCl$_3$): δ 173.6, 81.0, 72.5, 64.3, 34.3, 28.5, 25.6, 25.2, 24.8, 9.9.

Synthesis of poly[(ε-caprolactone)-co-(propylene oxide)]

ε-caprolactone (1 g) was added to a reaction vial after which the corresponding molar amount of propylene oxide was added to create a ratio of 1:1, 1:2 and 2:1. To this monomer mixture, 6 mL of dry dichloromethane was added after which the vial was sealed and kept in an inert nitrogen atmosphere. The catalyst was added from a stock solution to target a monomer-to-aluminum ratio of 214, 232 and 200 for EL:PO ratios of 1:1, 1:2 and 2:1. The reaction was then stirred and heated to 40° C. for 24 h. As the reaction increased the viscosity dramatically to quench the reaction a mixture of dichloromethane and methanol was added to ensure all the chains become terminated. The polymer was then rotovaped at 150 mbar and 45° C. to remove most solvent before being transferred to be vacuum dried. The sample at this time was weight to determine yield, and was used for NMR and GPC analysis.). $^1$H NMR (400 MHz, CDCl$_3$): δ 4.1 (—C(=O)CH$_2$CH$_2$CH$_2$CH$_2$CH$_2$O—), δ 2.3 (—C(=O)CH$_2$CH$_2$CH$_2$CH$_2$CH$_2$O—), δ 1.7 (—C(=O)CH$_2$CH$_2$CH$_2$CH$_2$CH$_2$O—), δ 1.4 (—C(=O)CH$_2$CH$_2$CH$_2$CH$_2$CH$_2$O—), δ 3.6-3.3 (—OCH$_2$CH(CH$_3$)O—), δ 1.6 (—OCH$_2$CH$_1$(CH$_2$CH$_3$)O—), δ 1.1 (—OCH$_2$CH(CH$_3$)O—). $^{13}$C NMR (100 MHz, CDCl$_3$): δ 173.7, 75.6, 73.5, 64.3, 34.3, 28.5, 25.6, 24.7, 17.6.

Synthesis of poly(lactide-co-ethylene oxide)

D,L-Lactide (13.25 g) was added to a glass reactor after which 43 mL of dry dichloromethane was added. The corresponding molar amount of ethylene oxide (4.18 g) relative to DL-lactide was added to create a molar ratio of 1:1. The catalyst was added from a stock solution to target a monomer-to-aluminum ratio of 208. The reaction was then stirred and heated to 40° C. for 24 h. As the reaction increased the viscosity dramatically to quench the reaction a mixture methanol was added to ensure all the chains become terminated. The polymer was then precipitated in ethanol before being transferred to be vacuum dried. The sample at this time was weight to determine yield, and was used for NMR and GPC analysis. $^1$H NMR (400 MHz, 2:1 CD$_2$Cl$_2$:CDCl$_3$): δ 5.2, 4.4 (—C(=O)CH(CH$_3$)—O—), δ 1.5 (—C(=O)CH(CH$_3$)—O—), δ 3.5-3.8 (—OCH$_2$CH$_2$O—). $^{13}$C NMR (100 MHz, CDCl$_3$): δ 169.2, 71.1, 69.8, 69.6, 17.1

Kinetic Experiments.

D,L-Lactide (0.1 g) was added to an NMR tube after which 0.6 mL of deuterated DICHLOROMETHANE was added. The corresponding molar amount of propylene oxide (0.04 g) was added to create a ratio of 1 to 1. To this monomer mixture, the Vandenberg catalyst (0.03 mL) was added to target a 10,000 g/mol. The reaction was then quickly placed in an Varian Inova 500 MHz NMR machine, and a time dependent study was run for 66 h. The NMR machine was at room temperature and took scans at specified time points. The same procedure was used with ε-caprolactone (0.1 g) and propylene oxide (0.05 g).

Degradation Experiments.

Poly(lactide-co-ethylene oxide) were compression molded to yield a square block of 1 cm$^2$ by 0.04 mm thickness of approximately 300 mg in weight. Each block was introduced into either a flask filled with 150-100 ml of 0.5M NaOH solution in 40:60 Methanol:Water by volume or water. The flasks were held at room temperature. Three specimens were withdrawn after two weeks into the study, washed with distilled water, wiped, dried in vacuum and weighed.

Results

Homopolymerization of DL-Lactide and Propylene Oxide.

Figure 2:
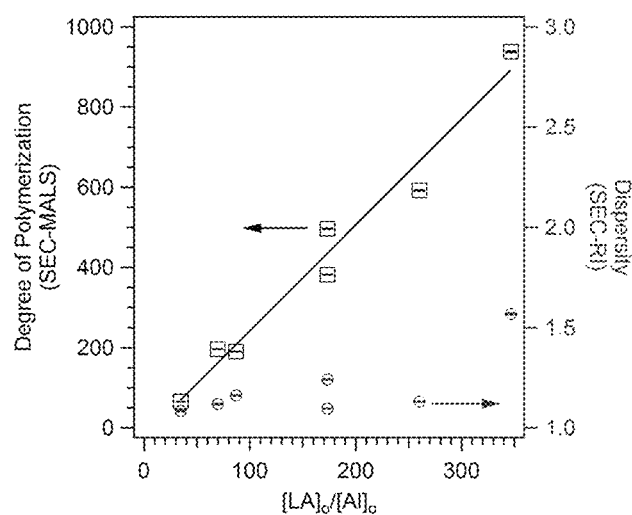
FIG. 2. Aluminum requirement and size exclusion for a poly(DL-lactide) chain. (a) The relationship between aluminum and molecular weight indicates that approximately four aluminum atoms are involved in the creation of a single poly(DL-lactide) chain. Degrees of polymerization were determined by size exclusion chromatography with a multi-angle light scattering detector using the (dn/dc) of 0.042 for poly(DL-lactide) in tetrahydrofuran. (b) Size exclusion chromatograms measured after each polymerization are shown.

The Vandenberg catalyst was developed originally for the polymerization of epoxides to high yields and high molecular weight. The activity of Vandenberg toward lactones has not yet been reported. Before copolymerization reactions were undertaken, the catalyst was tested for its performance in polymerization of DL-lactide. The structure of the Vandenberg catalyst is unknown, and it is possible that a dynamic distribution of species is present after its statistical preparation. No efforts to isolate individual components through crystallization have been successful. An additional observation and point of contrast with the Vandenberg catalyzed epoxide polymerizations is that the lactone polymerization benefit from the presence of trace impurities; likely trace water. Consistent conditions were maintained for each polymerization by carrying out reactions under a dry nitrogen atmosphere, but with solvents that were used as received, and not subject to further drying. For later copolymerizations this was not required, and dry solvents could be utilized. The homopolymerization of DL-lactide (LA) was carried out until complete consumption of monomer which took 48 h for a range of Vandenberg catalyst loadings which is presented as the concentration of aluminum; this is because the Vandenberg catalyst is likely a distribution of species and the active catalytic species is unknown. While aluminum loading typically does not correlate with ultimate molecular weight in epoxide polymerizations, in lactone polymerizations the aluminum loading was effective for producing a desired molecular weight. The ratio $[LA]_0/[Al]_0$ was varied over an order of magnitude from 35 to 350 and the ultimate degree of polymerization as measured by size exclusion chromatography with multi-angle light scattering (SEC-MALS) are shown in FIG. 1. The ultimate degree of polymerization was approximately two times $[LA]_0/[Al]_0$ at all loadings. Significantly, this suggests that approximately two aluminum atoms participate in the production of a single polyester chain. The size exclusion chromatograms are shown in FIG. 1. In general, the molecular weight distributions (differential refractive index signal) appeared to be multi-modal, but with dispersities of 1.07-1.34. These dispersities are remarkably lower than those that result from epoxide polymerizations which are typically 1.5-3.0. Two size exclusion chromatograms from a LA polymerization and from a propylene oxide (PO) polymerization are presented for comparison in FIG. 2. Both poly(propylene oxide) (PPO) and poly(DL-lactide) (PLA) were polymerized at equivalent monomer-to-aluminum ratios ($[M]_0/[Al]_0=140$). A final characteristic difference between epoxide and lactone polymerizations using Vandenberg catalyst is that the epoxide polymerizations are mildly isoselective resulting in a racemic mixture of isotactically enriched polyethers, whereas lactone polymerizations proceed without any stereochemical preference. Having gained a qualitative understanding of the separate homopolymerization of epoxide and lactones using the Vandenberg catalyst, the next step carried out the simultaneous statistical copolymerization of lactones DL-lactide and ε-caprolactone with epoxides epichlorohydrin, butylene oxide, propylene oxide, and ethylene oxide.

Scheme 3. General statistical copolymerization of lactones and epoxides.

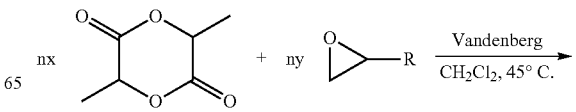

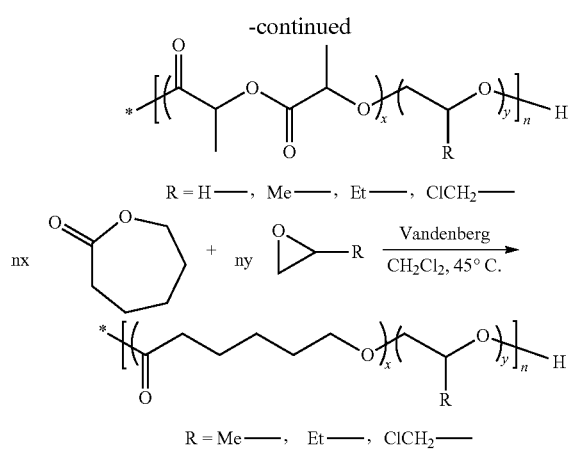

R = H ——, Me ——, Et ——, ClCH$_2$ ——

R = Me ——, Et ——, ClCH$_2$ ——

Copolymerization of Epoxides and Lactones.

Copolymerizations between lactones and epoxides were conducted by dissolving both monomers in dry dichloromethane under a nitrogen atmosphere. The copolymerization was initiated by the addition of a measured quantity of a solution of Vandenberg catalyst in diethyl ether through a septum into the monomer solution. The copolymerizations were conducted at 45° C. for up to 24 h. Typically, magnetic stirring ceased as the reaction viscosity increased. Polymerization was terminated by the addition of a methanol/dichloromethane solution. The copolymers were typically precipitated in methanol, washed with water/citric acid or acetylacetone to remove aluminum, and then characterized by $^1$H and $^{13}$C NMR spectroscopy, and size exclusion chromatography with light scattering, differential refractive index, and viscosity detectors to determine molecular weight distribution. Comonomer feed stoichiometry was varied from 2:1, 1:1, and 1:2 by mole for the lactone:epoxide comonomers. The following copolymers were synthesized: 1) Poly[(DL-lactide)-co-(ethylene oxide)], 2) poly[(DL-lactide)-co-(epichlorohydrin)], 3) poly[(DL-lactide)-co-(butylene oxide)], 4) poly[(DL-lactide)-co-(propylene oxide)], 5) poly[(ε-caprolactone)-co-(epichlorohydrin)], 6) poly[(ε-caprolactone)-co-(butylene oxide)], and 7) poly[(ε-caprolactone)-co-(propylene oxide)]. The general copolymerization scheme is shown in Scheme 3, and the results of the copolymerizations are shown in Table 1.

Generally, the molecular weights and dispersities of the copolymers of lactones and epoxides were consistent with polyethers that had been synthesized with the Vandenberg catalyst. However, the yields of the recovered copolymers were generally low, and the molecular weights were high with the highest at $M_n$=14 Mg/mol, and the lowest at 35 kg/mol. While there is no one-to-one correlation, the low yield of the copolymerizations is attributable to gelation at low monomer conversion due to the ultra-high molecular weight of the copolymerizations. Molecular weight distributions ranged from narrowly distributed, unimodal distributions with dispersities of 1.1 to broadly distributed materials with dispersities as high as 25. Generally, the DL-lactide containing copolymers exhibited lower dispersities. As shown in Table 1, poly[(DL-lactide)-co-(ethylene oxide)] exhibited a number-average molecular weight of 93 kg/mol, and a dispersity of 1.2.

Figure 3:
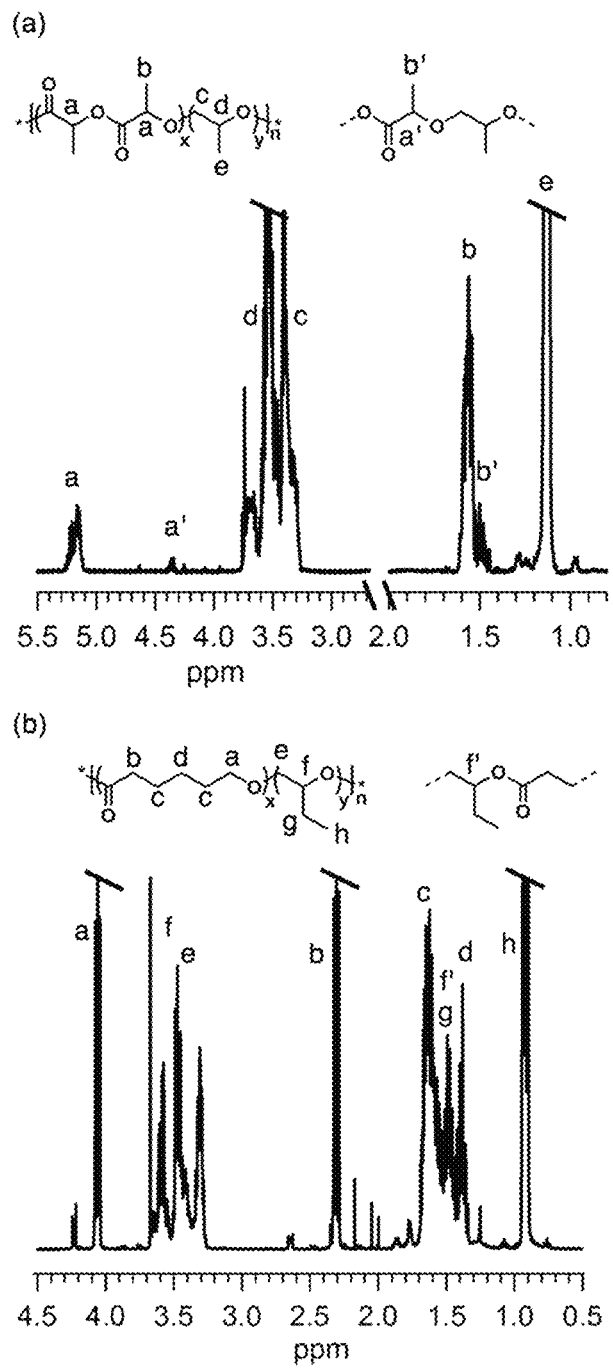
FIG. 3. Representative $^1$H NMR spectra of heterocopolymers. Heterocopolymers of (a) DL-lactide and butylene oxide, and (b) ε-caprolactone and butylene oxide. The spectra can be viewed as a superposition of the two homopolymers with an addition of a distinct few peaks which can be attributed to the distinct LA-PO dyads made up of both monomers.

Given the characteristic differences in the behavior of the Vandenberg catalyst toward homopolymerization of epoxides and lactones, the next experiments investigated how these differences in reactivity would relate in copolymerization. NMR spectroscopy of copolymers is often sensitive to copolymer composition, but also can identify characteristic comonomer sequences at the dyad or triad level of detail. A representative $^1$H NMR spectrum of poly[(DL-lactide)-co-(propylene oxide)] is shown in FIG. 3a, and a representative spectrum of poly[(ε-caprolactone)-co-(propylene oxide)] is shown in FIG. 3b. Structural assignments for each signal are provided. Largely, these spectra consist of the superposition of the separate spectra of pure polyester and pure polyether. However, in the case of poly[(DL-lactide)-co-(propylene oxide)] (FIG. 3a) dyad signals that are diagnostic for the presence of lactide-propylene oxide (LA-PO) dyad linkages at ca. 4.4 ppm that corresponds to the methine backbone proton on a lactide unit adjacent to an ether. Additional signals consistent with methyl (b', 3H) protons on lactide, and methyl (e', 3H) protons on propylene oxide in a LA-PO dyad were observed (FIG. 3a). A signal consistent with the methyl (e'', 3H) protons in propylene oxide in a PO-LA dyad were observed as well. For the $^1$H NMR spectrum of poly[(ε-caprolactone)-co-(propylene oxide)] shown in FIG. 3b signals were also observed that are characteristic of copolymer formation. A large quantity of ε-caprolactone monomer was present in the final material due to the reversible equilibrium nature of the ε-caprolactone. The propylene oxide was not reversible and was converted to polymer quantitatively. Signals consistent with the presence of poly(propylene oxide) and poly(ε-caprolactone) were present. However, one extra signals consistent with the presence of compositional dyads were also evident. The methyl signal of the propylene oxide-ester was observed at 1.6 ppm. Spectroscopic evidence for copolymer formation was evident in all $^1$H NMR spectra of all copolymers synthesized in this study.

The glass-transition temperature is a diagnostic property that can distinguish a copolymer from an immiscible homopolymer mixture. For a statistical copolymer, the $T_g$ should be intermediate between the $T_g$s of the corresponding pure components as described by the Flory-Fox equation if the copolymer is suitably random. The glass-transition temperature ($T_g$) of the copolymers containing DL-lactide only produced materials with $T_g$ between that of pure poly(DL-lactide) (60° C.), and those of poly(ethylene oxide) (−60° C.), poly(epichlorohydrin) (−22° C.), poly(butylene oxide) (−70° C.), and poly(propylene oxide) (−60° C.).

TABLE 1

Characteristics of poly(ester-co-ether)s

| Entry | Copolymer | $f_{lactone}$[a] | $F_{lactone}$[b] | $M_n$ (kg/mol)[c] | $M_w$ (kg/mol)[c] | Đ[d] | $T_g$[e] | $T_m$[e] |
|---|---|---|---|---|---|---|---|---|
| 1 | P(LA$_{0.45}$-co-EO$_{0.55}$) | 0.50 | 0.45 | 93 | 114 | 1.2 | −26 | 62 |
| 2 | P(LA$_{0.08}$-co-ECH$_{0.92}$) | 0.33 | 0.08 | 1,630 | 2,900 | 1.8 | −24 | no. |
| 3 | P(LA$_{0.45}$-co-ECH$_{0.55}$) | 0.50 | 0.45 | 4,160 | 5,730 | 1.5 | −30 | no. |
| 4 | P(LA$_{0.22}$-co-ECH$_{0.78}$) | 0.66 | 0.22 | *16,840 | 24,730 | *1.5 | −33 | no. |

TABLE 1-continued

Characteristics of poly(ester-co-ether)s

| Entry | Copolymer | $f_{lactone}{}^a$ | $F_{lactone}{}^b$ | $M_n$ (kg/mol)$^c$ | $M_w$ (kg/mol)$^c$ | Đ$^d$ | $T_g{}^e$ | $T_m{}^e$ |
|---|---|---|---|---|---|---|---|---|
| 5  | P(LA$_{0.40}$-co-BO$_{0.60}$)   | 0.33 | 0.40 | 166   | 1,860 | 11.1 | 30   | no.  |
| 6  | P(LA$_{0.25}$-co-BO$_{0.75}$)   | 0.50 | 0.25 | 29    | 327   | 11.2 | 26   | n.o. |
| 7  | P(LA$_{0.24}$-co-BO$_{0.76}$)   | 0.66 | 0.24 | 99    | 1,540 | 15.5 | 34   | n.o. |
| 8  | P(LA$_{0.19}$-co-PO$_{0.81}$)   | 0.33 | 0.19 | 2,760 | 3,180 | 1.2  | 18   | n.o. |
| 9  | P(LA$_{0.20}$-co-PO$_{0.80}$)   | 0.50 | 0.20 | 1,100 | 3,680 | 3.4  | 19   | n.o. |
| 10 | P(LA$_{0.34}$-co-PO$_{0.66}$)   | 0.66 | 0.34 | 80    | 514   | 6.5  | 18   | n.o. |
| 11 | P(CL$_{0.67}$-co-ECH$_{0.33}$)  | 0.33 | 0.67 | 150   | 2,710 | 18.0 | −47  | 28   |
| 12 | P(CL$_{0.48}$-co-ECH$_{0.52}$)  | 0.50 | 0.48 | 110   | 2,290 | 20.7 | −50  | 14   |
| 13 | P(CL$_{0.93}$-co-ECH$_{0.07}$)  | 0.66 | 0.93 | 41    | 500   | 12.2 | n.o. | 32   |
| 14 | P(CL$_{0.32}$-co-BO$_{0.68}$)   | 0.33 | 0.32 | 2,500 | 3,790 | 1.5  | n.o. | 51   |
| 15 | P(CL$_{0.29}$-co-BO$_{0.71}$)   | 0.50 | 0.29 | 515   | 1,570 | 3.1  | n.o. | 55   |
| 16 | P(CL$_{0.59}$-co-BO$_{0.41}$)   | 0.66 | 0.59 | 57    | 550   | 9.6  | n.o. | 52   |
| 17 | P(CL$_{0.20}$-co-PO$_{0.80}$)   | 0.33 | 0.20 | 137   | 794   | 5.8  | n.o. | 52   |
| 18 | P(CL$_{0.28}$-co-PO$_{0.72}$)   | 0.50 | 0.28 | 126   | 677   | 5.4  | n.o. | 51   |
| 19 | P(CL$_{0.51}$-co-PO$_{0.49}$)   | 0.66 | 0.51 | 45    | 372   | 8.3  | n.o. | 50   |

$^a$Initial mole fraction of lactone $f_{lactone} = n_{lactone}/(n_{lactone} + n_{epoxide})$.
$^b$Final cumulative mole fraction composition of copolymer measured by $_1$H NMR spectroscopy.
$^c$Number- and weight-average molecular weight determined by size exclusion chromatography in chloroform using light scattering and differential refractometer detectors. In instances where ultrahigh molecular weight materials are beyond the exclusion limit of size exclusion columns (~10 MDa), $M_n$ will be inaccurate. These values are preceded by an asterisk(*).
$^d$Dispersity was determined by size exclusion chromatography in chloroform using the differential refractometer signal. In instances where ultrahigh molecular weight materials were beyond the exclusion limit of the size exclusion columns (~10 MDa), Đ will be inaccurate. These values are preceded by an asterisk(*).
$^e$Thermal properties were measured by differential scanning calorimetry and recorded in Celsius.

For copolymers where one or both comonomers are capable of producing crystallinity in a corresponding homopolymer, the incorporation of a second repeat unit in a polymer backbone introduces defects to crystallization, which would depress the crystallization and melting transitions to lower temperatures. For the copolymers containing ε-caprolactone, the crystallinity of the poly(ε-caprolactone) component appeared to be relatively unaffected by copolymerization. This suggests that the architecture of the copolymer was most consistent with a strong gradient architecture. A more detailed analysis of copolymerization was carried out in order characterize the regiostructure of the resultant copolymers of DL-lactide and ε-caprolactone with propylene oxide.

In order to determine reactivity ratios, copolymerization kinetics were monitored with time between DL-lactide and propylene oxide as well as ε-caprolactone and propylene oxide. The consumption of both monomers was measured with time by $^1$H NMR spectroscopy as shown respectively in FIG. 4, and FIG. 5. In the copolymerization of DL-lactide and propylene oxide shown in FIG. 4, the simultaneous consumption of lactone and epoxide can be observed by the decrease in the integral of the epoxides signals at 2.3-3.0 ppm corresponding to 3H on the propylene oxide. The DL-lactide consumption was quantified by the decrease in the integral of the methine signal at 5.15 ppm corresponding to 2H per DL-lactide, and the methyl signal at 1.62 ppm corresponding to 6H per DL-lactide. The propylene oxide was consumed before DL-lactide.

Figure 4:
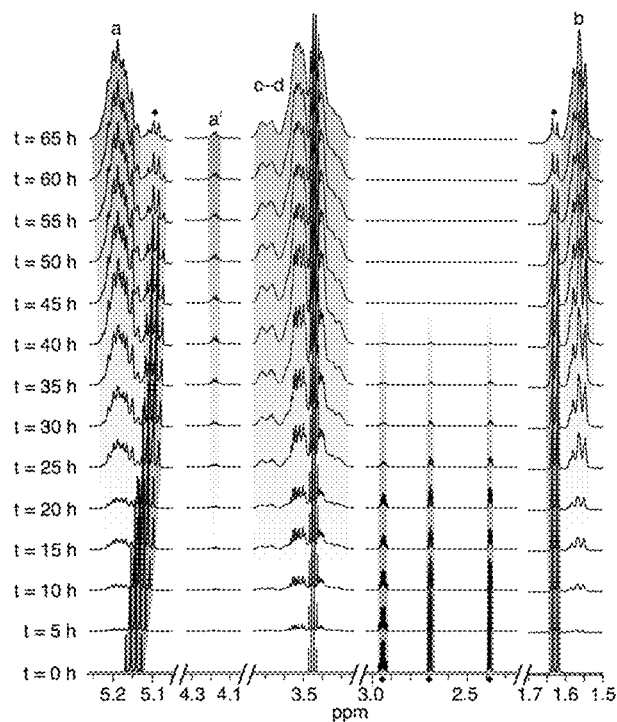
FIG. 4. $^1$H NMR spectroscopy of the copolymerization of propylene oxide and DL-lactide over 65 h at room temperature. DL-lactide resonances at δ 5.15 (2H) and 1.62 (6H) are shaded in blue, and propylene oxide resonances at δ 2.4-3.0 (3H) are shaded in red. Resonances associated with the copolymer are shaded in purple: (a) δ 5.18 2H, (a') δ 4.2 2H, (c', d, c) δ 3.4-3.7 3H, (b, b') δ 1.58 3H.

The compositional changes with time are sufficient to determine reactivity ratios, but do not uniquely differentiate between simultaneous homopolymerization and true copolymerization. In FIG. 4, a signal at 4.2 ppm (a') increased in intensity while propylene oxide and DL-lactide were both consumed. This signal was assigned to the methine (CH) on lactide within a LA-PO dyad. This assignment agrees with spectroscopic characterization of block junctions in low molecular weight diblock copolymers of polylactide with various polyethers. The direct observation of a growing signal consistent with a unique dyad during copolymerization is only consistent with a statistical copolymerization where both DL-lactide and propylene oxide are incorporating into a single polymer backbone.

Figure 5:
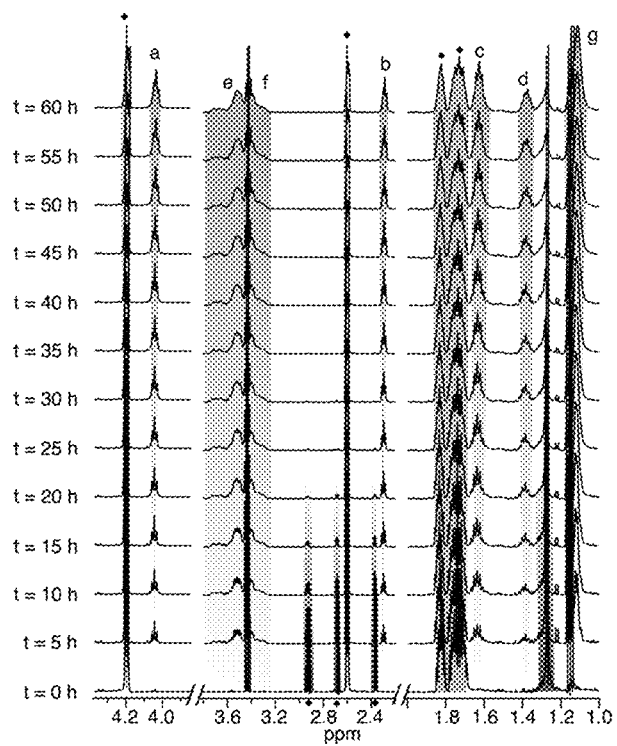
FIG. 5. $^1$H NMR spectroscopy of the copolymerization of propylene oxide and ε-caprolactone over 65 h at room temperature. ε-caprolactone resonances at δ 4.23 (2H), δ 2.64 (2H), δ 1.87 (2H), and 1.75 (4H) are shaded in blue, and propylene oxide resonances at δ 2.4, δ 2.8-2.6 (3H) are shaded in red. Resonances associated with the copolymer are shaded in purple: δ 4.05 (2H), δ 2.30 (2H), δ 1.62 (4H), and 1.38 (2H) (a) δ 5.18 2H, (a') δ 4.2 2H, (c', d, c) δ 3.4-3.7 3H, (b, b') δ 1.58 3H.

The copolymerization of ε-caprolactone and propylene oxide was similarly monitored for 65 hours using $^1$H NMR spectroscopy. The spectra are shown in FIG. 5. The consumption of propylene oxide was monitored by the integral of the epoxides signals at 2.3-3.0 ppm corresponding to 3H on propylene oxide. Propylene oxide was the preferred monomer and was consumed over the course of 30 hours. The consumption of ε-caprolactone was monitored by its methylene signals 4.4 and 2.8 ppm. The simultaneous consumption of comonomers in both copolymerizations combined with the growth of signals consistent with dyad formation were consistent with copolymer formation rather than simultaneous homopolymerization. Next, these data were used to determine reactivity ratios for the copolymerizations between propylene oxide and DL-lactide, and ε-caprolactone.

Figure 6:
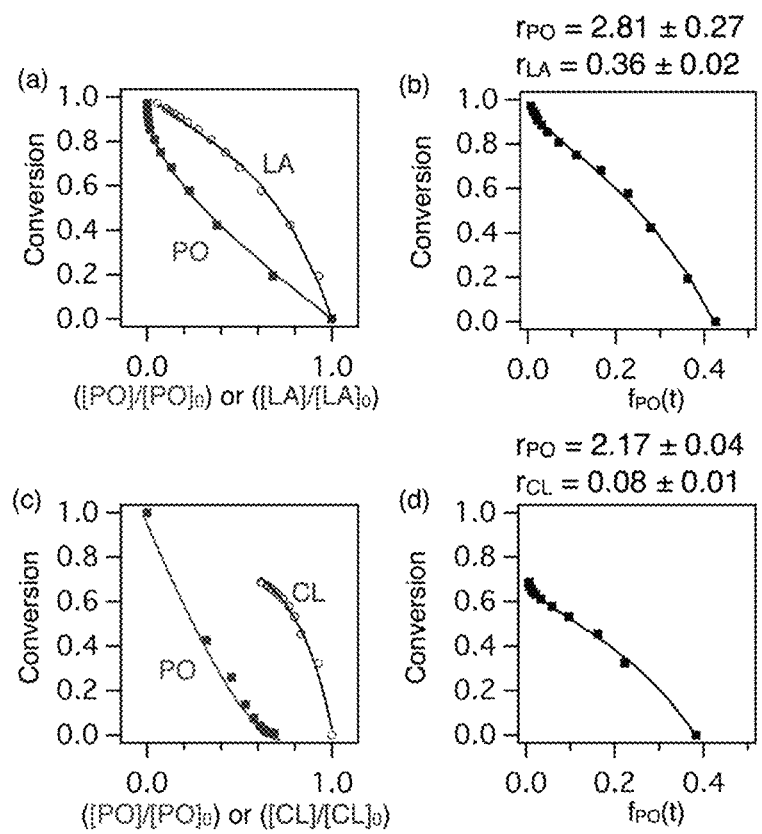
FIG. 6. Reactivity ratios extracted from the raw $^1$H NMR spectroscopy data (shown in FIG. 5) by two methods. (a) The non-terminal model of copolymerization kinetics reported by Beckingham et al. was used to produce an estimate of the reactivity ratios: $r_{PO}$=2.22±0.13, $r_{LA}$=0.21±0.02. (b) The Meyer-Lowry equation for the traditional terminal model of copolymerization produced similar values: $r_{PO}$=2.29±0.24, $r_{LA}$=0.36±0.02. The results of fitting by both methodologies were consistent. For ε-Caprolactone and propylene oxide the reversibility of the polymerization complicated interpretation of the copolymerization data. (c) Reactivity ratios could not be fit to the model of Beckingham et al. (d) The Meyer-Lowry equation produced a fit that was consistent with a strong gradient copolymer, but the model does not account for reversibility. The parameters should be regarded as effective reactivity ratios rather than being reflective of the underlying differences in reactivity between CL and PO.

The time-dependent composition of both epoxide and lactone were converted into dimensionless conversions in order to interpret the relative consumption of comonomers within the context of two integrated models of copolymerization capable of producing reactivity ratios from the data in FIGS. 5 and 6. For non-terminal copolymerization kinetics common in coordination-insertion type mechanisms, the model reported by Beckingham, Sanoja, and Lynd (BSL) was employed.

For a terminal model of copolymerization kinetics, the classical model of Meyer and Lowry (ML) was employed. The fits to the data are shown in FIG. 6. The non-terminal model (BSL) is the simplest model of copolymerization with the fewest parameters, and should be the first model used to extract reactivity ratios from experimental data. The compositional drift data were formatted to fit BSL and are shown in FIG. 6a. The non-terminal model yielded reactivity ratios of $r_{PO}$=2.22±0.13, and $r_{LA}$=0.21±0.02. The terminal model was utilized to extract reactivity ratios by fitting the same data formatted for the Meyer-Lowry equation. The reactivity ratios that resulted were consistent with those obtained by BSL: $r_{PO}$=2.29±0.24, and $r_{LA}$=0.36±0.02. These reactivity ratios are consistent with a purely gradient copolymer.

The determination of reactivity ratios for the copolymerization of ε-caprolactone and propylene oxide was complicated by incomplete consumption of ε-caprolactone. Propylene oxide was consumed earliest in the copolymerization with ε-caprolactone incorporating more slowly, and eventually ceasing to react beyond a conversion of ca. 60%. Lactone polymerizations can exhibit significant equilibrium behavior that results in an equilibrium concentration of monomer. Additionally, if the ε-caprolactone monomer were to have any appreciable tendency toward alternation then a fraction of ε-caprolactone monomer would also be obtained. Likewise, a combination of both monomer equilibrium and alternation could account for the remaining fraction of unreacted ε-caprolactone. Because of the unreacted fraction of ε-caprolactone, the BSL analysis of reactivity ratios was not possible. The compositional drift data, formatted for BSL, are shown in FIG. 6c. The extraction of reactivity ratios using the ML equation was possible, but these values are offered with the caveat that while they will describe the changes in bulk monomer composition with time, all of the error associated with the remaining unreacted ε-caprolactone will be interpreted by the model as alternation. This is reflected in the values that resulted: $r_{PO}$=2.17±0.04, and $r_{CL}$=0.08±0.01. The reactivity ratio for ε-caprolactone was nearly zero as a consequence of the unreacted monomer. Analysis of the abundance of sequences would be needed to corroborate the correctness of that value. However, it is likely an artifact of the equilibrium nature of the polymerization not being adequately described by the assumptions made in the derivation of the ML equation. In summary, reactivity ratios were determined for two representative copolymerizations between DL-lactide and ε-caprolactone copolymerized with propylene oxide using compositional data. The appearance of specific spectroscopic signatures of copolymerization through ester-ether dyad formation was observed as well. These observations are consistent with copolymerization of lactones and epoxides.

Figure 7:
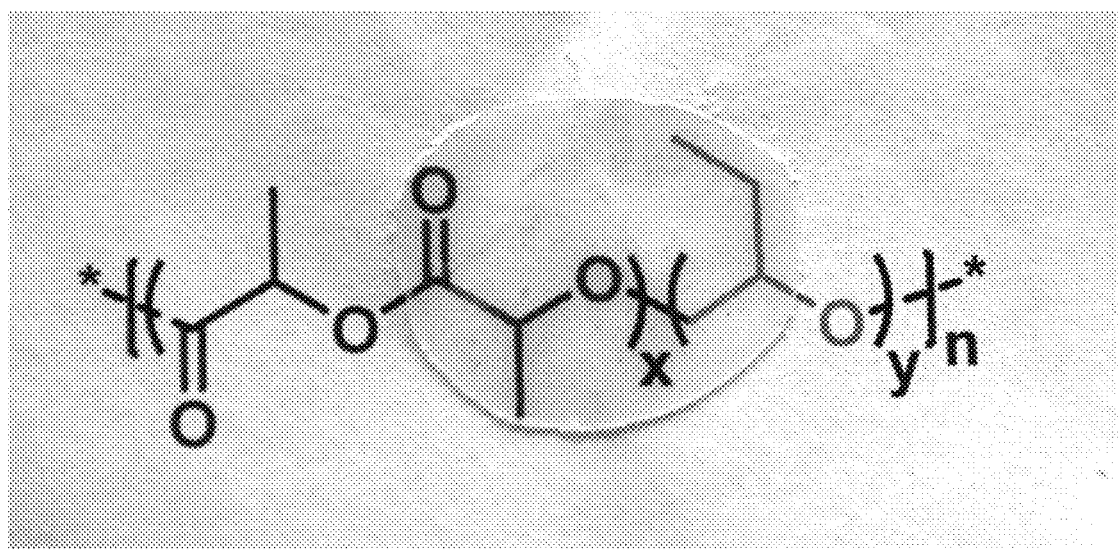
FIG. 7. Film of poly[(ε-caprolactone)-co-(propylene oxide)] was optically clear which was consistent with a copolymer rather than a homopolymer blend.

Spectroscopic evidence was consistent with the enchainment of both lactone and epoxide into a single heterocopolymer backbone. The visual appearance of a multi-component material can be diagnostic for its purity, morphology, and also miscibility in the case of homopolymer mixtures. Immiscible homopolymer mixtures will generally appear visually cloudy due to light scattering associated with phase separation, whereas copolymers will appear optically clear if spatially homogeneous, or if phase separation occurs on small length-scales (<100 nm). Films of dry copolymers were pressed into films between Teflon sheet at 70° C. A representative film of poly[(ε-caprolactone)-co-(propylene oxide)] is shown in FIG. 7. All films were optically clear consistent with majority copolymer compositions, and not homopolymer mixtures which would phase-separate, coarsen, and appear opaque.

Figure 8:
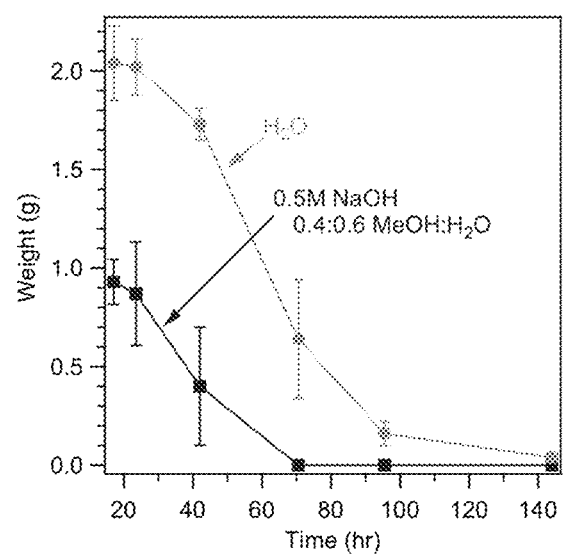
FIG. 8. Degradation experiments testing the performance of poly[(DL-lactide)-co-(ethylene oxide)]. The progress of degradation and solubilization of resulting PEO is plotted against time.

The poly(ester-co-ether) materials were examined to determine if they were hydrolytically degradable, which would be important in environmental and biomedical applications of these new materials. Degradation experiments were completed in both water, and under basic conditions. As can be seen in FIG. 8, there was a 75-80% decrease in weight of the starting polymer versus the ending material in both water, and basic water:methanol 50:50 mixture. This decrease in weight is not only attributed to degradation and removal of ester repeat units, but also due to loss of low molecular weight PEO that could be liberated as ester units were cleaved. Additionally, it was shown that the material degraded well in both basic and neutral conditions with the basic conditions leading to a higher rate of degradation. The rate of degradation was remarkably high for the copolymer in comparison to degradation rates of poly(DL-lactide) homopolymers. This enhancement in degradation was attributable to the increased hydrophilicity imparted by the presence of ethylene oxide repeat units, which may be tuned via composition of the copolymerization.

In summary, a synthetic technique was developed for the general statistical copolymerization of lactones and epoxides using the Vandenberg catalyst developed originally for the industrial production of polyethers. Copolymers were synthesized from DL-lactide and ethylene oxide, propylene oxide, butylene oxide, and epichlorohydrin, while ε-caprolactone was copolymerized with propylene oxide, butylene oxide, and epichlorohydrin. Spectroscopic compositional and sequential information combined with thermal and optical properties were consistent with heterocopolymer formation from lactone and epoxide monomer feedstocks. The presence of ester-ether heterodyads were directly observed by $^1$H NMR spectroscopy. Thermal and optical properties of the copolymers were also consistent with copolymer formation. Reactivity ratios were determined for poly[(DL-lactide)-co-(propylene oxide)] and suggest a gradient copolymer. Reactivity ratio determination for poly[(ε-caprolactone)-co-(propylene oxide)] was complicated by the equilibrium nature of ε-caprolactone. Significantly, these synthetic concepts enable compositional control of structure-property relationships in materials encompassing structural diversity that previously required more involved synthesis.[38,39] These new synthetic concepts expand the ability of modular and versatile copolymerization to encompass a greater diversity of repeat unit structures and to tune thermal, mechanical, and reactive properties of new functional polymeric materials derived from readily available and inexpensive precursors.

REFERENCES CITED IN THIS EXAMPLE (1) Zhang, X.-H.; Wei, R.-J.; Zhang, Y. Y; Du, B.-Y; Fan, Z.-Q. Carbon Dioxide/Epoxide Copolymerization via a Nano sized Zinc-Cobalt(III) Double Metal Cyanide Complex: Substituent Effects of Epoxides on Polycarbonate Selectivity, Regioselectivity and Glass Transition Temperatures. *Macromolecules* 2015, 48, 536-544.

(2) Inoue, S. Copolymerization of Carbon Dioxide and Epoxide. In *Carbon Dioxide as a Source of Carbon*; Springer Netherlands: Dordrecht, 1987; pp. 331-337.

(3) Han, B.; Zhang, L.; Kyran, S. J.; Liu, B.; Duan, Z.; Darensbourg, D. J. Copolymerization of Carbon Dioxide and Cyclohexene Oxide Catalyzed by Chromium Complexes Bearing Semirigid [ONSO]-Type Ligands. *J. Polym. Sci. A Polym. Chem.* 2016, 54, 1938-1944.

(4) Inoue, S.; Koinuma, H.; Tsuruta, T. Copolymerization of Carbon Dioxide and Epoxide. *Journal of Polymer Science Part B: Polymer Letters* 1969, 7, 287-292.

(5) Tominaga, Y.; Shimomura, T.; Nakamura, M. Alternating Copolymers of Carbon Dioxide with Glycidyl Ethers for Novel Ion-Conductive Polymer Electrolytes. *Polymer* 2010, 51, 4295-4298.

(6) Chisholm, M. H.; Zhou, Z. Concerning the Mechanism of the Ring Opening of Propylene Oxide in the Copolymerization of Propylene Oxide and Carbon Dioxide to Give Poly(Propylene Carbonate). *J. Am. Chem. Soc.* 2004, 126, 11030-11039.

(7) Inoue, S. Copolymerization of Carbon Dioxide and Epoxide: Functionality of the Copolymer. *Journal of Macromolecular Science: Part A—Chemistry* 2006, 13, 651-664.

(8) Inoue, S.; Koinuma, H.; Tsuruta, T. Copolymerization of Carbon Dioxide and Epoxide with Organometallic Compounds. *Makromol. Chem.* 1969, 130, 210-220.

(9) Lehenmeier, M. W.; Bruckmeier, C.; Klaus, S.; Dengler, J. E.; Deglmann, P.; Ott, A.-K.; Rieger, B. Differences in Reactivity of Epoxides in the Copolymerisation with Carbon Dioxide by Zinc-Based Catalysts: Propylene Oxide Versus Cyclohexene Oxide. *Chem. Eur. J.* 2011, 17, 8858-8869.

(10) Nakano, K.; Hashimoto, S.; Nakamura, M.; Kamada, T.; Nozaki, K. Stereocomplex of Poly(Propylene Carbonate): Synthesis of Stereogradient Poly(Propylene Carbonate) by Regio- and Enantioselective Copolymerization of Propylene Oxide with Carbon Dioxide. *Angew. Chem. Int. Ed.* 2011, 50, 4868-4871.

(11) Trott, G.; Saini, P. K.; Williams, C. K. Catalysts for CO2/Epoxide Ring-Opening Copolymerization. *Phil. Trans. R. Soc. A* 2016, 374, 20150085.

(12) Ryan C Jeske; Angela M DiCiccio, A.; Coates, G. W. *Alternating Copolymerization of Epoxides and Cyclic Anhydrides: an Improved Route to Aliphatic Polyesters*; American Chemical Society, 2007; Vol. 129, pp. 11330-11331.

(13) Baumgartner, R.; Song, Z.; Zhang, Y.; Cheng, J. Functional Polyesters Derived From Alternating Copolymerization of Norbornene Anhydride and Epoxides. *Polym. Chem.* 2015, 6, 3586-3590.

(14) Hosseini Nejad, E.; van *Melis*, C. G. W.; Vermeer, T. J.; Koning, C. E.; Duchateau, R. Alternating Ring-Opening Polymerization of Cyclohexene Oxide and Anhydrides: Effect of Catalyst, Cocatalyst, and Anhydride Structure. *Macromolecules* 2012, 45, 1770-1776.

(15) DiCiccio, A. M.; Longo, J. M.; Rodriguez-Calero, G. G.; Coates, G. W. Development of Highly Active and Regioselective Catalysts for the Copolymerization of Epoxides with Cyclic Anhydrides: an Unanticipated Effect of Electronic Variation. *J. Am. Chem. Soc.* 2016, 138, 7107-7113.

(16) Van Zee, N. J.; Sanford, M. J.; Coates, G. W. Electronic Effects of Aluminum Complexes in the Copolymerization of Propylene Oxide with Tricyclic Anhydrides: Access to Well-Defined, Functionalizable Aliphatic Polyesters. *J. Am. Chem. Soc.* 2016, 138, 2755-2761.

(17) Sudo, A.; Zhang, Y; Endo, T. Anionic Alternating Copolymerization of Epoxide and Six-Membered Lactone Bearing Naphthyl Moiety. *J. Polym. Sci. A Polym. Chem.* 2010, 49, 619-624.

(18) Tadokoro, A.; Takata, T.; Endo, T. Anionic Ring-Opening Alternating Copolymerization of a Bicyclic Bis (.Gamma.-Lactone) with an Epoxide: a Novel Ring-Opening Polymerization of a Monomer Containing a .Gamma.-Lactone Structure. *Macromolecules* 1993, 26, 4400-4406.

(19) Nakano, R.; Ito, S.; Nozaki, K. Copolymerization of Carbon Dioxide and Butadiene via a Lactone Intermediate. *Nature Chemistry* 2014, 6, 325-331.

(20) Romain, C.; Zhu, Y; Dingwall, P.; Paul, S.; Rzepa, H. S.; Buchard, A.; Williams, C. K. Chemoselective Polymerizations From Mixtures of Epoxide, Lactone, Anhydride, and Carbon Dioxide. *J. Am. Chem. Soc.* 2016, jacs.5b13070.

(21) Lee, B. F.; Wolffs, M.; Delaney, K. T.; Sprafke, J. K.; Leibfarth, F. A.; Hawker, C. J.; Lynd, N. A. Reactivity Ratios and Mechanistic Insight for Anionic Ring-Opening Copolymerization of Epoxides. *Macromolecules* 2012, 45, 3722-3731.

(22) Beckingham, B. S.; Sanoj a, G. E.; Lynd, N. A. Simple and Accurate Determination of Reactivity Ratios Using a Nonterminal Model of Chain Copolymerization. *Macromolecules* 2015, 48, 6922-6930.

(23) Darensbourg, D. J.; Chung, W.-C. Relative Basicities of Cyclic Ethers and Esters.

Chemistry of Importance to Ring-Opening Co- and Terpolymerization Reactions. *Polyhedron* 2013, 58, 139-143.

(24) Shi, W.; McGrath, A. J.; Li, Y; Lynd, N. A.; Hawker, C. J.; Fredrickson, G. H.; Kramer, E. J. Cooperative and Sequential Phase Transitions in It-Poly(Propylene Oxide)-B-Poly(Ethylene Oxide)-B-It-Poly(Propylene Oxide) Triblock Copolymers. *Macromolecules* 2015, 48, 3069-3079.

(25) McGrath, A. J.; Shi, W.; Rodriguez, C. G.; Kramer, E. J.; Hawker, C. J.; Lynd, N. A. Synthetic Strategy for Preparing Chiral Double-Semicrystalline Polyether Block Copolymers. *Polym. Chem.* 2015, 6, 1465-1473.

(26) Vandenberg, E. J. Organometallic Catalysts for Polymerizing Monosubstituted Epoxides. *J. Polym. Sci. A Polym. Chem.* 1960, 47, 486-489.

(27) Munoz-Hernandez, M.-A.; Keizer, T. S.; Wei, P.; Parkin, S.; Atwood, D. A. Reactivity and Derivatization of Five-Coordinate, Chelated Aluminum. *Inorganic Chemistry* 2001, 40, 6782-6787.

(28) Atwood, D. A.; Yearwood, B. C. The Future of Aluminum Chemistry. *Journal of Organometallic Chemistry* 2000, 600, 186-197.

(29) Munoz-Hernandez, M.-A.; Keizer, T. S.; Parkin, S.; Zhang, Y.; Atwood, D. A. Chelated Aluminum Alkoxides. *J Chem Crystallogr* 2000, 30, 219-222.

(30) Francis, J. A.; Bott, S. G.; Barron, A. R. Aluminium Compounds Containing Bidentate Ligands: Chelate Ring Size and Rigid Conformation Effects. *J. Chem. Soc., Dalton Trans.* 1998, 3305-3310.

(31) Francis, J. A.; McMahon, C. N.; Bott, S. G.; Barron, A. R. Steric Effects in Aluminum Compounds Containing Monoanionic Potentially Bidentate Ligands: Toward a Quantitative Measure of Steric Bulk. *Organometallics* 1999, 18, 4399-4416.

(32) McMahon, C. N.; Francis, J. A.; Bott, S. G.; Barron, A. R. Aluminium Compounds Containing Bidentate Ligands: Ligand Base Strength and Remote Geometric Control Over Degree of Association. *J. Chem. Soc., Dalton Trans.* 1999, 67-72.

(33) McMahon, C. N.; Obrey, S. J.; Keys, A.; Bott, S. G.; Barron, A. R. Reaction of 1,3-Diols with Al(tBu)3 and Ga(tBu)3: Aluminium- and Gallium-Based Bifunctional Tetradentate Ligands. *J. Chem. Soc., Dalton Trans.* 2000, 2151-2161.

(34) Wu, B.; Harlan, C. J.; Lenz, R. W.; Barron, A. R. Stereoregular Polymerization of (R,S)-Propylene Oxide by an Alumoxane-Propylene Oxide Complex †. *Macromolecules* 1997, 30, 316-318.

(35) Branch, C. S.; van Poppel, L. G.; Bott, S. G.; Barron, A. R. Molecular Structure of ($^{T}$Bu)3Al[OUC(OPh)2]. *J Chem Crystallogr* 1999, 29, 993-996.

(36) Mason, M. R.; Smith, J. M.; Bott, S. G.; Barron, A. R. Hydrolysis of Tri-Tert-Butylaluminum: the First Structural Characterization of Alkylalumoxanes [(R2Al)2O]N and (RAlO)N. *J. Am. Chem. Soc.* 1993, 115, 4971-4984.

(37) Liu, H.; Zhang, J. Research Progress in Toughening Modification of Poly(Lactic Acid). *J. Polym. Sci. B Polym. Phys.* 2011, 49, 1051-1083.

(38) Zhang, D.; Xu, J.; Alcazar-Roman, L.; Greenman, L.; Cramer, C. J.; Hillmyer, M. A.; Tolman, W. B. Isotactic Polymers with Alternating Lactic Acid and Oxetane Subunits From the Endoentropic Polymerization of a 14-Membered Ring. *Macromolecules* 2004, 37, 5274-5281.

(39) Bechtold, K.; Hillmyer, M. A.; Tolman, W. B. Perfectly Alternating Copolymer of Lactic Acid and Ethylene Oxide as a Plasticizing Agent for Polylactide. *Macromolecules* 2001, 34, 8641-8648.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

We claim:

1. A statistical copolymer comprising:
epoxide monomers and lactone monomers;
wherein the epoxide monomers and lactone monomers are both capable of homopropagation;
wherein the epoxide monomers and lactone monomers are incorporated into a single heterocopolymer backbone in a statistical manner and not in an alternating or block arrangement of comonomers;
wherein the molecular weight of the copolymer is greater than 10 kg/mol, and wherein the lactone monomers are DL-lactide.

2. The copolymer of claim 1, wherein the epoxide monomers are selected from epichlorohydrin, butylene oxide, propylene oxide, or ethylene oxide.

3. The copolymer of claim 1, wherein the molar ratio of lactone monomer to epoxide monomer is from 1:10 to 10:1.

4. The copolymer of claim 1, wherein the molecular weight of the copolymer is greater than 100 kg/mol.

5. A statistical copolymer comprising:
epoxide monomers and lactone monomers;
wherein the epoxide monomers and lactone monomers are both capable of homopropagation;
wherein the epoxide monomers and lactone monomers are incorporated into a single heterocopolymer backbone in a statistical manner and not in an alternating or block arrangement of comonomers;
wherein the molecular weight of the copolymer is greater than 10 kg/mol, and
wherein the copolymer comprises the formula:

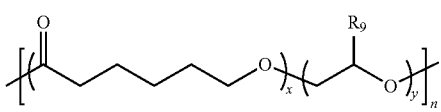

wherein:
$R_9$ is selected from hydrogen, alkyl, cycloalkyl, haloalkyl, aryl, or alkoxy;
x is a mole or weight percentage of a lactone monomer in the copolymer selected from 0.1 to 99.9%;
y is a mole or weight percentage of an epoxide monomer in the copolymer selected from 100−x %; and
n is an integer number of total repeat units selected from 50 to 500,000.

6. A statistical copolymer comprising:
epoxide monomers and lactone monomers;
wherein the epoxide monomers and lactone monomers are both capable of homopropagation;
wherein the epoxide monomers and lactone monomers are incorporated into a single heterocopolymer backbone in a statistical manner and not in an alternating or block arrangement of comonomers;
wherein the molecular weight of the copolymer is greater than 10 kg/mol, and wherein the copolymer comprises the formula:

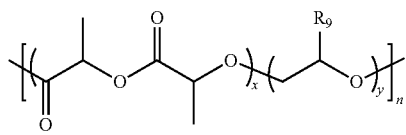

wherein:
$R_9$ is selected from hydrogen, alkyl, cycloalkyl, haloalkyl, aryl, or alkoxy;
x is a mole or weight percentage of a lactone monomer in the copolymer selected from 0.1 to 99.9%;
y is a mole or weight percentage of an epoxide monomer in the copolymer selected from 100−x %; and
n is an integer number of total repeat units selected from 50 to 500,000.

7. A statistical copolymer comprising:
epoxide monomers and lactone monomers;
wherein the epoxide monomers and lactone monomers are both capable of homopropagation;
wherein the epoxide monomers and lactone monomers are incorporated into a single heterocopolymer backbone in a statistical manner and not in an alternating or block arrangement of comonomers;
wherein the molecular weight of the copolymer is greater than 10 kg/mol, and wherein the copolymer comprises the formula:

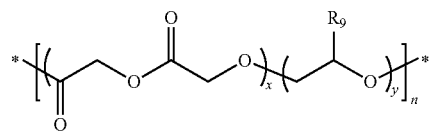

wherein:
$R_9$ is selected from hydrogen, alkyl, cycloalkyl, haloalkyl, aryl, or alkoxy;
x is a mole or weight percentage of a lactone monomer in the copolymer selected from 0.1 to 99.9%;
y is a mole or weight percentage of an epoxide monomer in the copolymer selected from 100−x %; and
n is an integer number of total repeat units selected from 50 to 500,000.

* * * * *